United States Patent
Katougi et al.

[11] Patent Number: 6,153,972
[45] Date of Patent: Nov. 28, 2000

[54] LIGHT BULB DEVICE

[75] Inventors: Masayuki Katougi; Hideo Moriyama; Kazuaki Murata, all of Tokyo, Japan

[73] Assignee: Moriyama Sangyo Kabushiki Kaisha, Japan

[21] Appl. No.: 09/077,260

[22] PCT Filed: Aug. 28, 1997

[86] PCT No.: PCT/JP97/03001

§ 371 Date: May 22, 1998

§ 102(e) Date: May 22, 1998

[87] PCT Pub. No.: WO98/14733

PCT Pub. Date: Apr. 9, 1998

[30] Foreign Application Priority Data

Sep. 30, 1996 [JP] Japan .................................. 8-258626
Dec. 20, 1996 [JP] Japan .................................. 8-342039
Jun. 2, 1997 [JP] Japan .................................. 9-143831

[51] Int. Cl.[7] ............................... H01J 1/62; H01J 63/04
[52] U.S. Cl. ................... 313/493; 313/634; 313/318.02; 362/260
[58] Field of Search ........................... 313/567, 578, 313/493, 318.02, 318.01, 318.08, 318.12, 439; 362/211, 226, 225, 217, 249, 390, 240; 315/71, 72, 73, 51

[56] References Cited

U.S. PATENT DOCUMENTS 5,173,632  12/1992  Dolan et al. ............................... 313/25
5,465,025  11/1995  Hendrickson ....................... 313/318.09
5,828,170  10/1998  Nishio et al. ........................... 313/493
5,844,357  12/1998  Idia et al. ............................... 313/493
5,911,499   6/1999  Stafford et al. ........................ 362/240
5,912,536   6/1999  Michiels et al. ....................... 315/248

Primary Examiner—Michael H. Day
Assistant Examiner—Matthew J. Gerike
Attorney, Agent, or Firm—Morrison Law Firm

[57] ABSTRACT

A globe (11) and a substrate (12) form an outer shell (1). In the outer shell (1), there is arranged an attachment (3) having an electric lamp mount (32) and a support stand part (33). In the electric lamp mount (32) of the attachment (3), there is arranged a serially connected body of no-base type small electric lamps (4), and at the support stand part (33), there is arranged a support body (5). The serially connected body of no-base type small electric lamps (4) has a plurality of no-base type small electric lamps (51) and conductors (52) for serially connecting these no-base type small electric lamps (51), is composed by gathering these plurality of no-base type small electric lamps (51). The support body (5) supports the serially connected body of no-base type small electric lamps (4). Since the serially connected body of no-base type small electric lamps (4) that is contained within the outer shell (1) is supported by the support (5), it is possible to improve vibrationproof of the serially connected body of no-base type small electric lamps (4) and support the serially connected body of no-base type small electric lamps (4) in a prescribed position within the outer shell (1).

22 Claims, 20 Drawing Sheets

LIGHT BULB DEVICE

TECHNICAL FIELD

The present invention relates to an electric lamp device containing electric lamps within an outer shell having a globe and a base.

BACKGROUND ART

Conventionally, as shown in the Utility Model Publication Laid-open 138160/1986 or the Utility Model Publication 20603/1968 for example, electric lamp devices sealing a plurality of small electric lamps in a serial connection within an outer shell is known.

In these electric lamp devices, a glass bulb is used as the outer shell, and a plurality of serially connected small electric lamps are contained and arranged within the glass bulb. At both ends of these serially connected small electric lamps, lead wires are connected, and by means of these lead wires, the serially connected small electric lamps are to be mechanically supported within the glass bulb and electrically connected to a base which is fixed to the glass bulb.

In addition, according to the prior art, as shown in the Utility Model Publication 20603/1968, an electric lamp device using a synthetic resin globe as an outer shell, instead of the glass bulb, so as to contain and arrange small electric lamps within this globe is also known.

In this electric lamp device, small electric lamps are to be mechanically supported within the globe and electrically connected to a base which is fixed to the globe by means of lead wires extended from the small electric lamps.

However, for both of the electric lamp devices of the prior art, since small electric lamps that are contained and arranged within the glass bulb or globe are supported only by means of lead wires, there is a drawback about vibrationproofing. In particular, when a plurality of serially connected small electric lamps are to be contained and arranged within the glass bulb, in addition to the poor vibrationproofing, sometimes it is difficult to support them in a prescribed position within the glass bulb.

Also, with regard to the electric lamp device like this, since no consideration was given about interchangeability of parts between different types of devices and special parts were used for each type, each device was expensive.

It is an object, therefore, of the present invention to provide an electric lamp device that, when a plurality of no-base type small electric lamps are to be serially contained within an outer shell, can improve the vibrationproof of the these no-base type small electric lamps and support them in a prescribed position within the outer shell.

Further, another object of the present invention is to provide a diversified electric lamp device that easily allows combinations of different electric lamp types by making parts interchangeable, including outer shells.

DISCLOSURE OF INVENTION

The present invention has a globe having an opening and a light transmitting part; an outer shell having an opening for connecting the globe in which an opening of the globe is connected to one end, and providing at the other end a substrate having a relatively slender opening for connecting power supply, compared with the opening for connecting the globe; an electric lamp mount part arranged in a substrate within the outer shell; a serially connected body of no-base type small electric lamps having a plurality of no-base type small electric lamps and conductors for serially connecting these no-base type small electric lamps, these no-base type small electric lamps being gathered, mounted to said electric lamp mount part and contained within said outer shell; and a support body, extended from the substrate, for supporting said serially connected body of no-base type small electric lamps within said outer shell. Thereby, since the serially connected body of no-base type small electric lamps to be mounted to the electric lamp mount part and contained within the outer shell is supported by the support body, the vibrationproof of the serially connected body of no-base type small electric lamps can be improved and it is possible to support the serially connected body of no-base type small electric lamps at a prescribed position within the outer shell.

Also, the present invention has a globe having an opening and a light transmitting part; an outer shell having an opening for connecting the globe in which an opening of the globe is connected to one end, and providing at the other end a substrate having a relatively slender opening for connecting power supply, compared with the opening for connecting the globe; an attachment having a sheet part, an electric lamp mount part and an extended part of a support body that are engaged within the opening of said substrate for connecting the globe; a serially connected body of no-base type small electric lamps having a plurality of no-base type small electric lamps and conductors for serially connecting these no-base type small electric lamps, these no-base type small electric lamps being gathered and mounted to the electric lamp mount part of said attachment, and conductors of both ends being led to the opening for connecting power supply of said substrate, passing through the attachment; and a support body, extended from the support stand part of said attachment, for supporting said serially connected body of no-base type small electric lamps within said outer shell. Thereby, since the serially connected body of no-base type small electric lamps to be mounted to the electric lamp mount part of the attachment and contained within the outer shell is supported by the support body extended from the support stand part of the attachment, the vibrationproof of the serially connected body of no-base type small electric lamps can be improved and it is possible to support the serially connected body of no-base type small electric lamps at a prescribed position within the outer shell, and what is more, it is possible to share the outer shell and easily combine different electric lamp types by the attachment, thereby providing a diversified electric lamp device.

Further, the present invention has a globe having an opening and a light transmitting part; an outer shell having an opening for connecting the globe in which an opening of the globe is connected to one end, and providing at the other end a substrate having a relatively slender opening for connecting power supply, compared with the opening for connecting the globe; an electric lamp mount part arranged in a substrate within the outer shell; a serially connected body of no-base type small electric lamps having a plurality of no-base type small electric lamps having sealed parts, these no-base type small electric lamps being gathered and serially connected, and the sealed parts of no-base type small electric lamps being supported by said electric lamp mount part and contained within said outer shell. Thereby, since the sealed parts of no-base type small electric lamps are supported by the electric lamp mount part, the vibrationproof of the serially connected body of no-base type small electric lamps can be improved and it is possible to support the serially connected body of no-base type small electric lamps at a prescribed position within the outer shell.

Still further, the present invention has a globe having an opening and a light transmitting part; an outer shell having an opening for connecting the globe in which an opening of the globe is connected to one end, providing at the other end a substrate having a relatively slender opening for connecting power supply, compared with the opening for connecting the globe, and having a guide tube part opened toward the opening for connecting the globe and connected to the opening for connecting power supply; an attachment having a sheet part engaged within the opening for connecting the globe of said substrate, an electric lamp mount part and a tube part engaged within the guide tube part of the substrate and connected to the electric lamp mount part; and electric lamps mounted to the electric lamp mount part of the attachment. Thereby, it is possible to share the outer shell and easily combine different electric lamp types by the attachment, thereby providing a diversified electric lamp device.

Still further, the support body has an insulating support part in which a conductor support groove to which conductors of a serially connected body of no-base type small electric lamps are formed and a post by which the insulating support part is supported. Thereby, since the support body has the insulating support part forming the conductor support groove, the conductors of the serially connected body of no-base type small electric lamps can be supported.

Still further, the support body has an insulating support part, in which a plurality of conductor support grooves to which a plurality of conductors for serially connecting a plurality of no-base type small electric lamps of a serially connected body of no-base type small electric lamps are formed, and a post by which the insulating support part is supported. Thereby, since the support body has the insulating support part that forms a plurality of conductor support grooves, it is possible to support a plurality of conductors with different potentials with a single insulating support part and simplify the construction.

Still further, the serially connected body of no-base type small electric lamps has an intermediate connecting body and the support body supports the intermediate connecting body of said serially connected body of no-base type small electric lamps. Thereby, since a part of the intermediate joint part of the serially connected body of no-base type small electric lamps can be easily hooked up with the support body, it is possible to improve the supporting performance of the the serially connected body of no-base type small electric lamps.

Still further, the support body forms a conductive path of the serially connected body of no-base type small electric lamps at its one end. Thereby, it is possible to simplify the power flow structure for the connector for no-base type small electric lamps.

Still further, the attachment has a plurality of projections for supporting conductors of the serially connected body of no-base type small electric lamps and separating no-base type small electric lamps from the attachment. Thereby, it is possible to prevent temperatures of the attachment and the substrate from rising that otherwise occurs due heat generation during the while the no-base type small electric lamps are on.

Still further, no-base type small electric lamps of the the serially connected body of no-base type small electric lamps are each made as a both-end-sealed type structure and arranged almost in parallel with an axial direction of the outer shell, and, the conductor has a first conductor part that is arranged at ends of no-base type small electric lamps apart from the substrate and a second conductor part that is arranged at ends of no-base type small electric lamps close to the substrate, the support body supports the first conductor part of said serially connected body of no-base type small electric lamps, and the attachment has a plurality of projections for supporting the second conductor part of said serially connected body of no-base type small electric lamps and separating no-base type small electric lamps from the attachment. Thereby, since the first conductor part of the serially connected body of no-base type small electric lamps is supported by the support body and the second conductor part of the serially connected body of no-base type small electric lamps is supported by the projections, it is possible to firmly support the no-base type small electric lamps of the serially connected body of no-base type small electric lamps at both ends, thereby improving vibrationproofing.

Still further, no-base type small electric lamps are sealed with a xenon gas in the glass bulbs. Therefore, it is possible to make them compact, long-life and high-efficiency.

Still further, the globe is freely occluded with and dissociated from the substrate and provides a first water sealing means for water-sealing said globe and substrate. Therefore, it is possible to replace bulbs inside, and an outdoor use is also possible.

Still further, the globe is freely occluded with and dissociated from the substrate and provides a second water sealing means for water-sealing said globe and attachment, a third water sealing means for water-sealing said attachment and substrate, and a fourth water sealing means for water-sealing the guide tube part of said substrate and the tube part of the attachment. Thereby, it is possible to replace bulbs inside, and an outdoor use as well as an improvement in waterproofing is also possible.

Still further, the globe is freely occluded with and dissociated from the substrate and provides a second water sealing means for water-sealing said globe and attachment, a third water sealing means for water-sealing said attachment and substrate, a fourth water sealing means for water-sealing the guide tube part of said substrate and the tube part of the attachment, and a pressure control means for adjusting pressure, both inside and outside the globe, by controlling said fourth water sealing means when pressure inside a space enclosed with said globe and attachment rises above a prescribed pressure value. Thereby, it is possible to replace bulbs inside, and an outdoor use as well as an improvement in waterproofing is possible, and what is more, since pressure inside the globe is adjusted by the pressure control means, it is possible to prevent dewing inside the globe.

Still further, the globe is formed by molding a colored transparent synthetic resin. Therefore, it is possible to provide an electric lamp device with a large quantity of colored light.

Still further, the base that is mounted to the opening for connecting power supply of the substrate is provided. Thereby, a usage similar to that of incandescent lamps is made possible.

BRIEF DESCRIPTIONS OF DRAWINGS

FIG. 1 is a sectional view of an electric lamp device showing a first embodiment according to the present invention, FIG. 2 is a top view showing a condition of the same electric lamp device after removing a globe, FIG. 3 is a side view of a substrate of the same electric lamp device, FIG. 4 is a top view of the same substrate, FIG. 5 is a side view of an attachment of the same electric lamp device, FIG. 6 is a top view of the same attachment, FIG. 7 is a side view of the same electric lamp device, FIG. 8 is a sectional view of an electric lamp device showing a second embodiment according to the present invention, FIG. 9 is a sectional view of an electric lamp device showing a third embodiment according to the present invention, FIG. 10 is a top view showing a condition of the same electric lamp device after removing a globe, FIG. 11 is a sectional view of an electric lamp device showing a fourth embodiment according to the present invention, FIG. 12 is a top view showing a condition of the same electric lamp device after removing a globe, FIG. 13 is a partially sectional view of an electric lamp device showing a fifth embodiment according to the present invention, FIG. 14 is a top view of a serially connected body of no-base type small electric lamps of the same electric lamp device viewed through a globe, FIG. 15 is a perspective view of the serially connected body of no-base type small electric lamps and the support body of the same electric lamp device, FIG. 16 is a perspective view of an electric lamp device showing a sixth embodiment according to the present invention, FIG. 17 is a perspective view of a serially connected body of no-base type small electric lamps of the same electric lamp device, FIG. 18 is a partially sectional view of an electric lamp device showing a seventh embodiment according to the present invention, FIG. 19 is a top view of a serially connected body of no-base type small electric lamps of the same electric lamp device during light transmission, FIG. 20 is a circuit diagram of the serially connected body of no-base type small electric lamps of the same electric lamp device, FIG. 21 is a side view of an electric lamp device showing an eighth embodiment according to the present invention, FIG. 22 is a sectional view of an electric lamp device showing a ninth embodiment according to the present invention, FIG. 23 is a top view showing a condition of the same electric lamp device after removing a globe, FIG. 24 is a side view showing a developed condition of a serially connected body of no-base type small electric lamps of the same electric lamp device, FIG. 25 is a perspective view showing an arrangement of the same serially connected body of no-base type small electric lamps, FIG. 26 is a side view of an electric lamp device showing a tenth embodiment according to the present invention, FIG. 27 is a side view of an electric lamp device showing an eleventh embodiment according to the present invention, and FIG. 28 is a side view of an electric lamp device showing an twelfth embodiment according to the present invention.

BEST MODES FOR CARRYING OUT THE INVENTION

Embodiments according to the present invention are described along with drawings in the following.

FIG. 1 is a sectional view of an electric lamp device, FIG. 2 is a top view showing a condition of the electric lamp device after removing a globe, FIG. 3 is a side view of a substrate, FIG. 4 is a top view of the substrate, FIG. 5 is a side view of an attachment, FIG. 6 is a top view of the attachment, and FIG. 7 is a side view of the electric lamp device.

Figure 1:
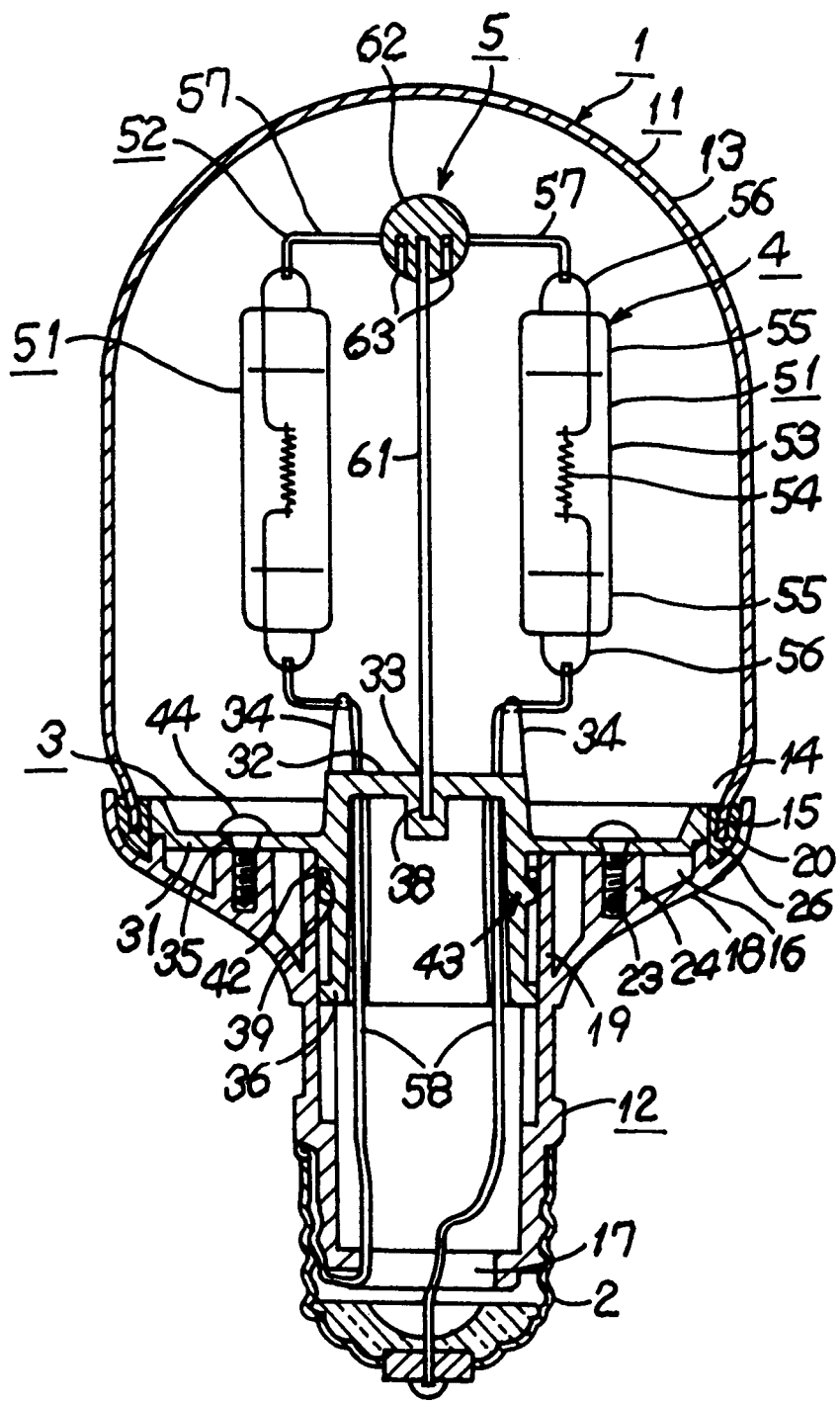
FIG. 1 through FIG. 7 show a first embodiment.
Figure 2:
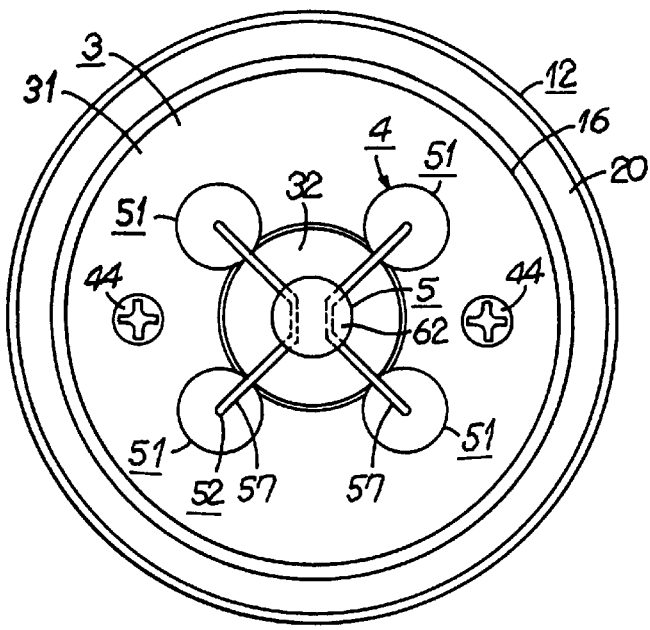
Figure 3:
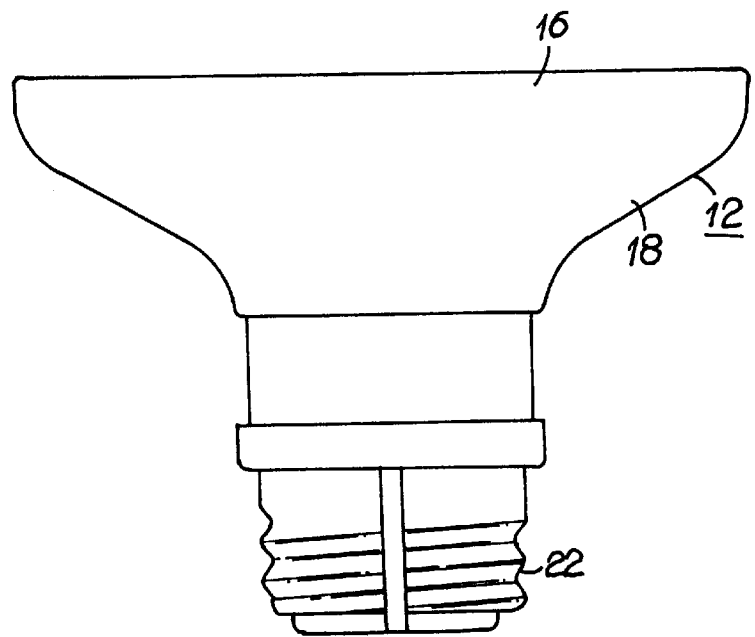
Figure 4:
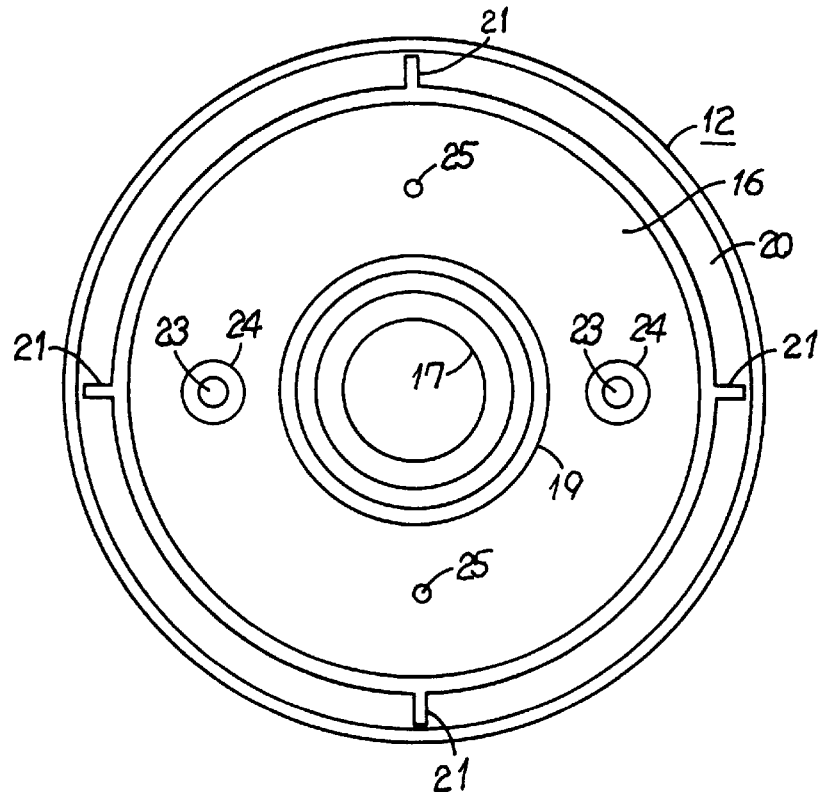

In these figures, a reference numeral 1 is an outer shell, a reference numeral 2 is a base, a reference numeral 3 is an attachment, a reference numeral 4 is a serially connected body of no-base type small electric lamps, and a reference numeral 5 is a support body. First, the outer shell 1 is composed of a globe 11 and a substrate 12.

The globe 11 is made of a transparent glass, for example, and an entire body is formed as a light transmitting part 13, in which an opening 14 is formed at one end and an open end 15 to be connected to a substrate 12 is formed in a periphery of the opening 14.

The substrate 12 is formed with a substantially light transmitting material, such as BMC. At one end, there is formed a relatively wide opening for connecting the globe 11 which is to be connected to the open end 15 of the globe 11, and at the other end, there is formed a relatively narrow opening for connecting power supply 17, and in a middle part, there is formed a guide tube part 19, which is connected to a skirt part 18 and the opening for connecting power supply 17 and opened toward the opening for connecting the globe 16 within the substrate 12, is formed.

At the opening for connecting the globe 16, there is formed a peripheral slit 20 with which the open end 15 of the globe 11 is engaged, and in the peripheral slit 20, there are formed monolithically and scattered into several points ribs 21 for floating the open end 15 of the globe 11.

In the periphery of the opening for connecting power supply 17, there is formed a threaded groove 22.

On an inside face of the skirt part 18, a boss 24 providing a fitting hole 23 is monolithically formed. In the skirt part 18, there are formed small holes 25 passing through the skirt part 18. These small holes 25, as described later, are intended to relieve pressure of a space formed by the globe 11 and the attachment 3.

Also, to connect the globe 11 to the substrate 12, first a silicon bond 26 is charged to the peripheral groove 20 of the substrate 12, and then the open end 15 of the globe 11 is inserted into the peripheral groove 20. When the silicon bond 26 is hardened, the outer shell 1 is completed. As described later, since the peripheral groove 20 is formed jointly by a peripheral edge of the attachment 3 and the substrate 12, the globe 11 is bonded air-tight to the attachment 3, too. Thus, in this instance the silicon bond 26 also functions as a first water sealing means for water-sealing the globe 11 and the attachment 3.

Further, the base 2 is the threaded E26 type and is mounted to the opening for connecting power supply 17 by screwing the threaded groove 22.

Still further, the attachment 3 has a sheet part 31, an electric lamp mount part 32, a support stand part 33, projections 34, a threaded insert hole 35 and a tube part 36.

The sheet part 31 is occluded within the opening for connecting the globe 16 of the substrate 12 and forms a part of the peripheral groove 20 of the opening for connecting the globe 16 by a peripheral edge.

The electric lamp mount part 32 is formed protruding from the sheet part 31 toward the globe 11 in the center of the attachment 3, and there four conductor holes 37 are formed at equal intervals.

The support stand part 33 is formed with a hole part 38 that is formed in the center of the attachment 3.

Projections 34 are formed adjacent to the conductor holes 37 of the electric lamp mount part 32.

The threaded insert hole 35 is formed in a position opposing to the boss 24 of the substrate of the sheet part 31.

Figure 5:
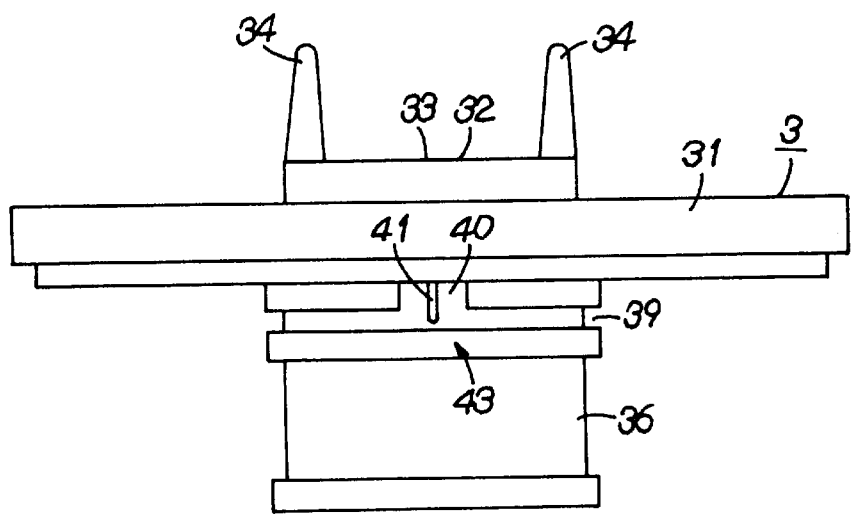
Figure 6:
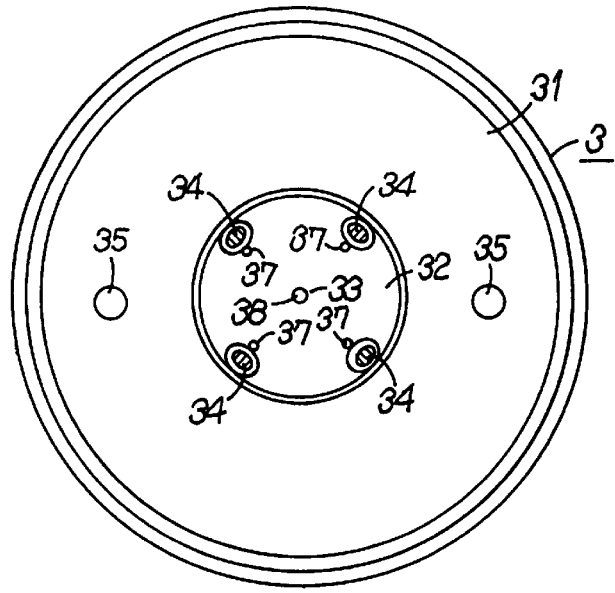
Figure 7:
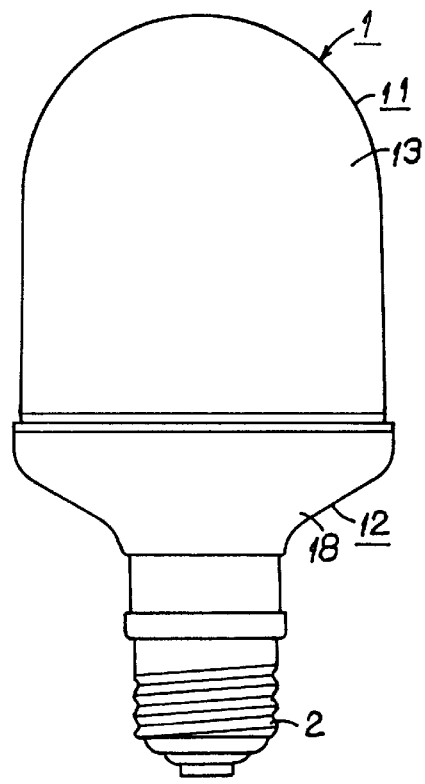

The tube part 36 is protruding and opened toward a rear face of the attachment 3, and a peripheral groove 39 is formed around it. As shown in FIG. 5, a part of the peripheral groove 39 is connected to a concave part 40 formed on the sheet part 31 side, and a shallow vertical groove 41 is formed from the concave part 40 to an upper half of the peripheral groove 39. In the peripheral groove 39, an O-ring 42 is mounted. Normally, the O-ring 42 does not cross the vertical groove 41. Also, the O-ring 42 is used as a water sealing means for water-sealing the tube part 36 and the guide tube part 19 of the substrate 12. Further, the concave part 40, the vertical groove 41 and the O-ring 42, as described later, form a pressure control means 43 for adjusting pressure inside and outside the globe 11.

Also, the attachment 3 is fixed to the substrate 12 by screwing tap screws 44 into the boss 24 of the substrate 12.

Further, the serially connected body of no-base type small electric lamps 4 has four no-base type small electric lamps 51 and conductors 52 for serially connecting these no-base type small electric lamps 51.

No-base type small electric lamps 51 are a both-end-sealed type structure and each provides a slender valve 53, a filament 54 sealed inside the valve 53, seal parts 55 of a pinch seal type formed at both ends of the valve 53, and looped external lead wires 56 extended from the seal parts 55.

No-base type small electric lamps 51 are each of a specification such as a valve diameter of 10 mm, an overall length of 43 mm, and with a xenon gas sealed as an inactive gas, a nominal rated voltage of 26V, nominal power consumption of 10.6 W, a flux of 112 lm, a color temperature of 2600 K, and a rated longevity of 6,000 hrs. Additionally, as another specification, nominal power consumption of 10 W, a flux of 90 lm, a color temperature of 2500 K, and a rated longevity of 20,000 hrs is also available.

Also, No-base type small electric lamps 51 are each arranged so as its tube axis is in parallel with an axial direction of the globe 11 and at equal intervals along a coaxial circle of an axis of the globe 11.

Conductors 52 each has intermediate conductors 57 to be connected to four no-base type small electric lamps 51 and end conductors 58, provided at both ends, to be connected to ends of no-base type small electric lamps 51, and these intermediate conductors 57 and end conductors 58 are connected mechanically and electrically to external lead wires 56 of no-base type small electric lamps 51. That is, an external lead wire 56 of each no-base type small electric lamp 51 on the top side of the globe 11 is connected by two intermediate conductors 57 and an external lead wire 56 of the no-base type small electric lamp 51 on the attachment 3 side is connected by one intermediate conductor 57, and external lead wires 56 at both ends of the no-base type small electric lamp 51 are connected to end conductors 58, and thus they are connected serially as a whole.

Also, though not illustrated in drawings, both the intermediate conductor 57 and the end conductor 58 are inserted through a conductor hole 37 of the electric lamp mount part 32. That is, the intermediate conductor 57 of its both ends is inserted from a rear face side of the attachment 3 into the conductor hole 37, and on the front face side of the attachment 3, spot-welded to the external lead wire 56. End conductors 58 at both ends are extended to the rear side of the attachment 3 and connected to the base 2.

Additionally, intermediate conductors 57 positioned on the top side of the globe 11 are formed as first conductor parts and intermediate joint parts, and intermediate conductors 57 and end conductors 58 positioned on the substrate 12 side are formed as second conductor parts.

Also, the support body 5 has a post 61 and an insulating support part 62.

The post 61 is a metal rod and embedded into the hole part 38 of the support stand part 33.

The insulating support part 62 is made of an insulating polyamide resin and fixed to a top end of the support 61, and a pair of curved conductor support grooves 63 are formed in a bottom face.

Also, to the conductor support grooves 63 of the insulating support part 62, intermediate conductors 57 that form first conductor parts and intermediate joint parts are fixed with a bond by positioning them above serial connectors for no-base type small electric lamps 4.

Like this, since the serially connected body of no-base type small electric lamps 4 is supported, at its top and bottom, by the support body 5 and the attachment 3, a mechanically sufficient strength can be attained against external vibrations.

Also, when pressure in the space formed with the globe 11 and the attachment 3 rises during lighting the electric lamp device, the O-ring 42 is pushed and deformed by the concave part 40 of the peripheral groove 39 of the attachment 3 (see FIG. 5; however, the O-ring 42 is not illustrated there) and the O-ring 6 crosses the vertical groove 41. Then, air in said space enters into the tube part 36 by passing through conductor holes 37 of the attachment 3, and further the air is discharged outside the electric lamp device from small holes 25 of the substrate 12 by passing through a gap between the tube part 36 and the guide tube part 19, a gap between the O-ring 42 and the vertical groove 41, and a gap between the guide tube part 19 and the sheet part 31 of the attachment 3.

On the other hand, when the electric lamp device is put off and the globe 11 is cooled, the internal pressure is lowered but air is stopped by the O-ring 42 and does not enter from the outside. Therefore, inside the globe 11, dewing of moisture that may be brought from the outside by a breathing due to repeated on-off operations never occurs.

Additionally, this electric lamp device has the globe 11 with a maximum outside diameter of 70 mm and an overall length of 140 mm, and a power consumption of approx. 40 W.

An electric lamp device composed as described above has operational effects, as follows.

Since the serially connected body of no-base type small electric lamps 4 that is mounted to the electric lamp mount part 32 of the attachment 3 and contained in the outer shell 1 is supported by the support body 5 extended from the support stand part 33 of the attachment 3, it is possible to improve vibrationproof of the serially connected body of no-base type small electric lamps 4 and support the serially connected body of no-base type small electric lamps 4 in a prescribed position within the outer shell 1, and what is more, it is possible to share the outer shell 1 and easily combine different electric lamp types by the attachment 3, thereby providing a diversified electric lamp device. Also, the support body 5 has the insulating support part 62, in which a plurality of conductor support grooves 63 to which a plurality of conductors 52 of the serially connected body of no-base type small electric lamps 4 for serially connecting a plurality of no-base type small electric lamps 51 are formed, and the post 61 by which the insulating support part 62 is supported. Since the support body 5 has the insulating support part 62 in which a plurality of conductor support grooves 63 are formed, it is possible to support a plurality of conductors 52 with different potentials by a single insulating support part 62, thereby enabling simplification.

Also, the serially connected body of no-base type small electric lamps 4 has an intermediate joint part and the support body 5 supports the intermediate joint part of the serially connected body of no-base type small electric lamps 4. Since a part of the intermediate joint part of the serially connected body of no-base type small electric lamps 4 can be easily hooked up with the support body 5, it is possible to improve the supporting performance of the the serially connected body of no-base type small electric lamps 4.

Further, the attachment 3 has a plurality of projections 34 for supporting conductors 54 of the serially connected body of no-base type small electric lamps 4 and separating no-base type small electric lamps 51 from the attachment. Thereby, it is possible to prevent temperatures of the attachment 3 and the substrate 12 from rising that otherwise occurs due heat generation during the while the no-base type small electric lamps 51 are on.

Still further, no-base type small electric lamps 51 of the the serially connected body of no-base type small electric lamps 4 are each made as a both-end-sealed type structure and arranged almost in parallel with an axial direction of the outer shell 1, and, the conductor 52 has a first conductor part that is arranged at ends of no-base type small electric lamps 51 apart from the substrate 12 and a second conductor part that is arranged at ends of no-base type small electric lamps 51 close to the substrate 12, the support body 5 supports the first conductor part of the serially connected body of no-base type small electric lamps 4, and the attachment 3 has a plurality of projections 34 for supporting the second conductor of the serially connected body of no-base type small electric lamps 4 and separating no-base type small electric lamps 51 from the attachment 3. Thereby, since the first conductor part of the serially connected body of no-base type small electric lamps 4 is supported by the support body 5 and the second conductor part of the serially connected body of no-base type small electric lamps 4 is supported by the projections 34, it is possible to firmly support the no-base type small electric lamps 51 of the serially connected body of no-base type small electric lamps 4 at both ends, thereby improving vibrationproofing.

Still further, no-base type small electric lamps 51 are sealed with a xenon gas in glass bulbs 53. Therefore, it is possible to make them compact, long-life and high-efficiency.

Still further, by bonding the globe 11 and the joint part of the substrate 12 and by seal-fixing the attachment 3 to the substrate 12, water-sealing is easily possible, thereby enabling an outdoor use as well as an indoor use. Also, since the pressure control means 43 is provided, which adjusts pressure both inside and outside the globe 11 by controlling the O-ring 42 when pressure inside the space enclosed with the globe 11 and the attachment 3 rises a prescribed pressure value, it is possible to prevent dewing inside the globe.

Still further, the base 2 that is mounted to the opening for connecting power supply 17 of the substrate 12 is provided. Thereby, enabling the electric lamp device to allow replacement between ordinary electric lamps for lighting with rated power consumption values of 20 to 100 W.

Still further, since no-base type small electric lamps 51 light at a low voltage, essentially long life design is available, and a rated longevity under an AC condition of 5,000 to 30,000 hrs can be attained. Also, since lamps of this type have been used for automobiles and sound equipment and high reliability lamps that are relatively free of a difference in longevity can easily be obtained, the reliability does not extremely fall short even by serial connection. Therefore, it is possible to make the electric lamp device extremely long-life, compared with an ordinary electric lamp for lighting.

Still further, it is possible to mount different types of electric lamps only by changing the attachment 3. That is, in the substrate 12, the guide tube part 19 that is connected to the opening for connecting power supply 17 and opened toward the opening for connecting the globe 16 is formed inside. Also, in the attachment 3, the tube part 36 that is engaged with the guide tube 19 of the substrate 12 is formed. The electric lamp mount part 32 can be designed properly for electric lamps to be mounted. Accordingly, when a single electric lamp having a threaded base like a krypton lamp, for example, is to be mounted, a threaded socket matching an E17 type base may be arranged for the electric lamp mount part 32. Also, when a single low-voltage halogen lamp is to be mounted, a socket matching its G4 or GY6.35 type base may be arranged. Additionally, a rated longevity of both a krypton lamp and a low-voltage halogen lamp is 2,000 hrs, and it is 1,000 times the life of an ordinary electric lamp for lighting.

Incidentally, the globe 11 may be formed by molding a colored transparent synthetic resin, and thereby it is possible to provide colored electric lamps with a large quantity of light, compared to conventional electric lamps.

Figure 8:
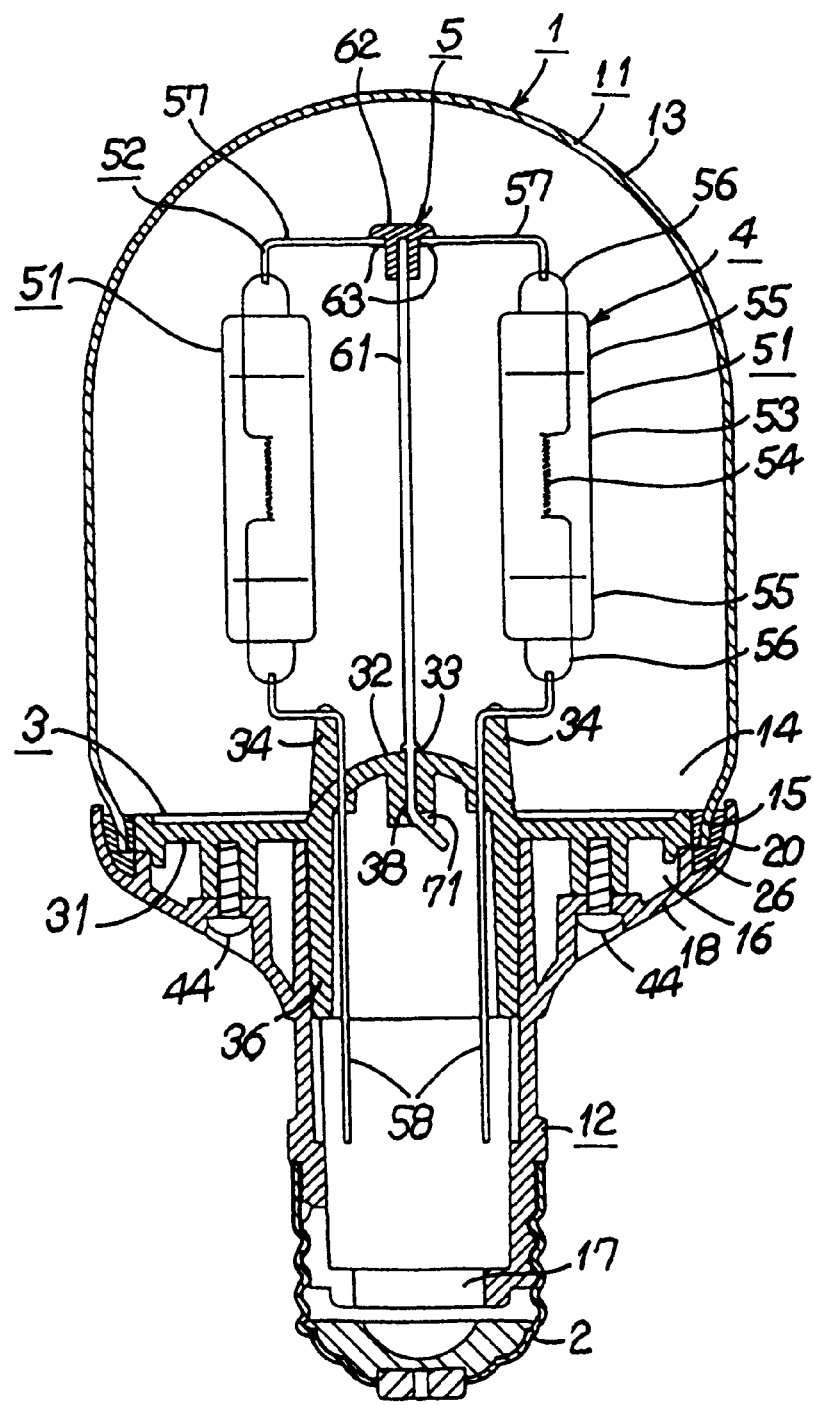

Next, FIG. 8 shows a second embodiment according to the present invention.

Additionally, with regard to structures and operational effects similar to those of the first embodiment, same symbols are used and their descriptions are omitted.

FIG. 8 is a sectional view of an electric lamp device.

In this second embodiment, the electric lamp mount part 32 of the attachment is formed swelling in an arc shape. Since a light of no-base type small electric lamps 51 is reflected by the electric lamp mount part 32, it is possible to improve flux distribution.

Also, at a lower part of the hole part 38 of the support stand part 33, there is provided a lock groove 71, and a bottom end of a post 61 of the support body 5 is connected to the lock groove 71. Thereby, the support body 5 and the serially connected body of no-base type small electric lamps 4 can be locked. Also, since the attachment 3 is fixed by screwing tap screws 44 from an outside of the substrate 12 into the same, the serially connected body of no-base type small electric lamps 4 does not disturb operation of tap screws 44 even when it is mounted to the attachment 3, thereby facilitating operation of the tap screws 44.

Figure 9:
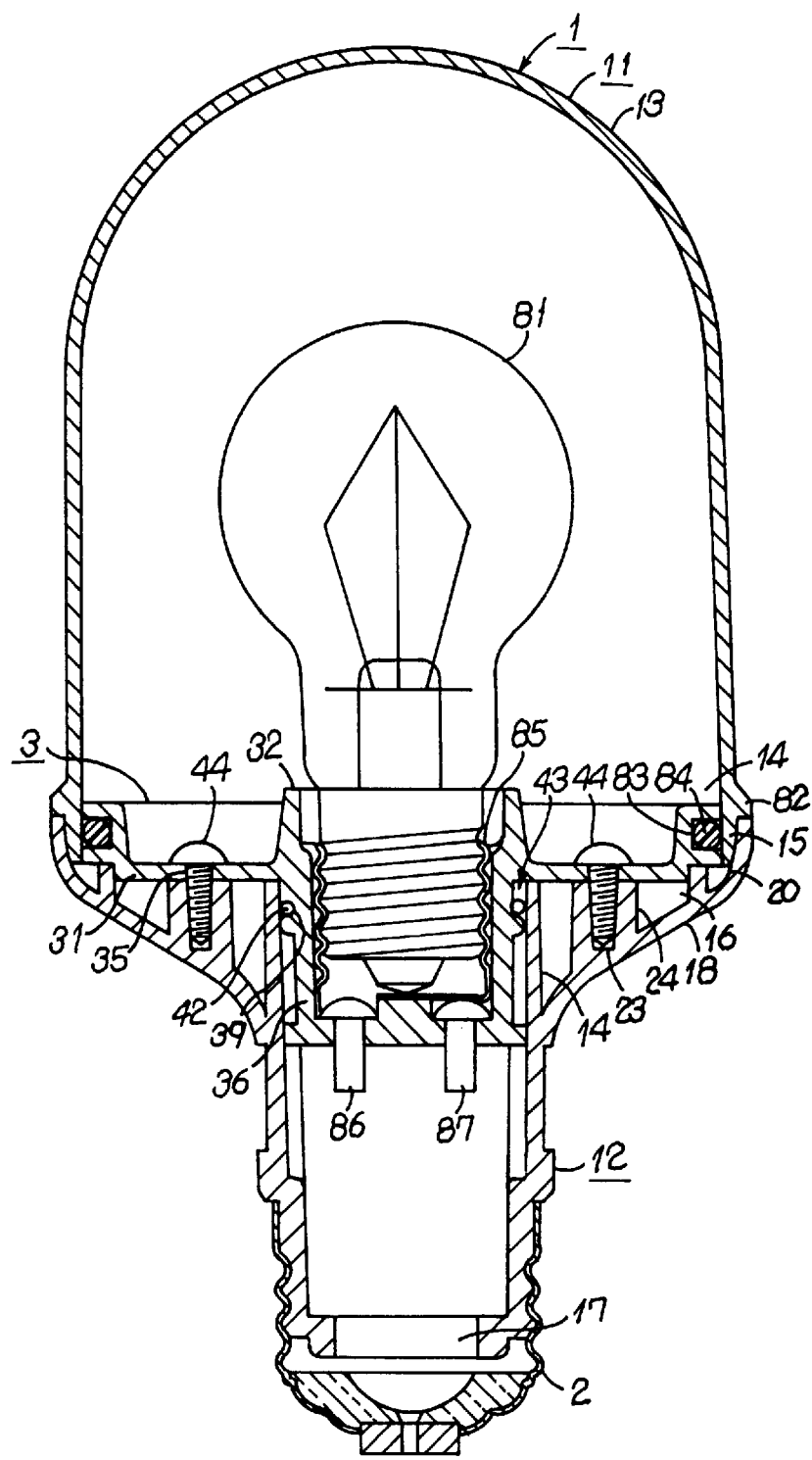
Figure 10:
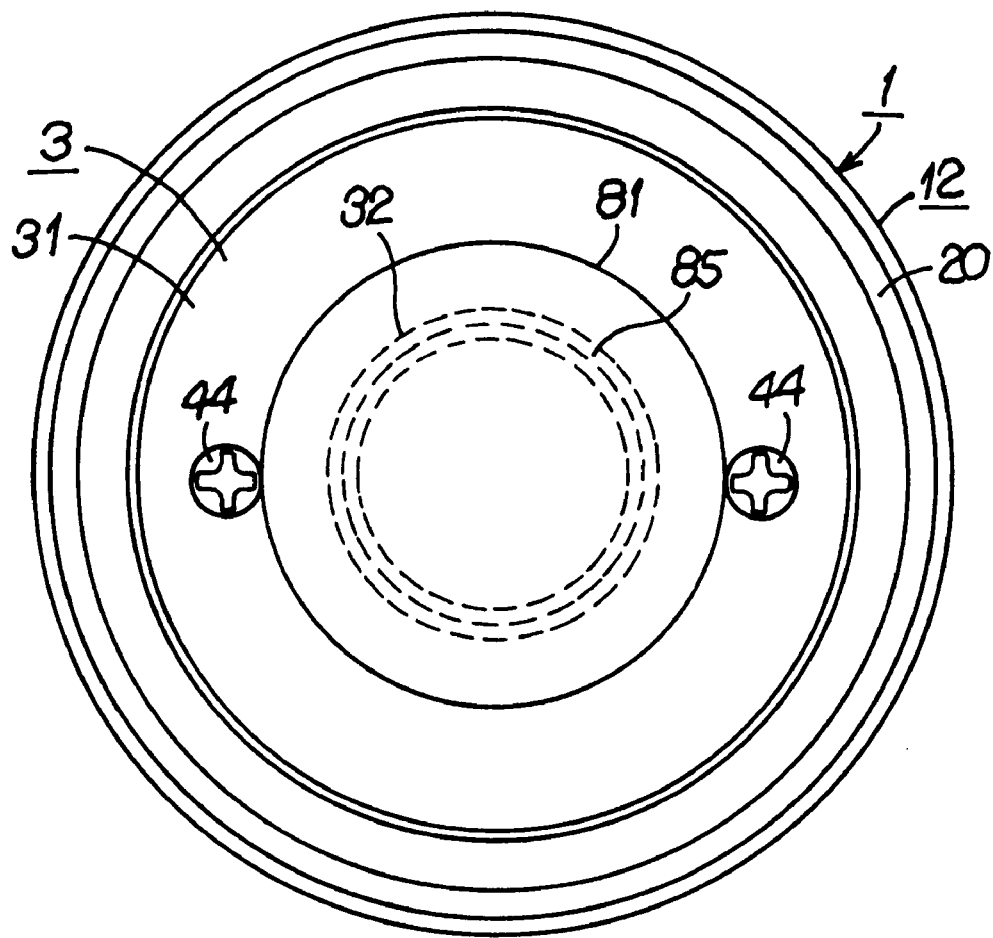

Next, FIG. 9 and FIG. 10 show a third embodiment according to the present invention.

Additionally, with regard to structures and operational effects similar to those of the aforementioned embodiments, same symbols are used and their descriptions are omitted.

FIG. 9 is a sectional view of an electric lamp device, and FIG. 10 is a top view showing a condition of the electric lamp device after removing a globe.

In this third embodiment, krypton lamps 81 are used, and the globe 11 is made freely occluded and dissociated to enable replacement of the krypton lamps 81. The globe 11 is made of a polycarbonate resin, and by roughing an inside face by sand blasting, it is made light-diffusing. Also, at the open end 15 of the globe 11, there is formed a loop convex 82 that functions as a stopper when inserting the globe 11. The loop convex 82 also works to enhance the open end 15.

The substrate 12 and the base 2 are the same as the parts used in the first embodiment (FIG. 1).

In the sheet part 31 of the attachment 3, there is formed a peripheral groove 83 around its periphery, and an O-ring 82 is arranged inside the peripheral groove 83.

The electric lamp mount part 32 of the attachment 3 is opened to the globe 11 side, and an E17 type socket 85 is arranged inside.

The base 2 of the tube part 36 of the attachment 3 is closed so as to arrange the socket 85.

A pair of terminals 86 and 87 of the socket 85 are connected to the base 2.

Thus, it is possible to compose an electric lamp device which makes transparent and small-bulb krypton lamps 81 light-diffusing and has a massive appearance similar to that of ordinary electric lamps for lighting or bulb type fluorescent lamps having large bulb sizes.

Since the krypton lamp 81 has a rated longevity of 2,000 hrs, which is long compared with an ordinary electric lamp for lighting but short compared with the rated longevity of at least 10,000 hrs obtained by the first embodiment, that replacement is possible is convenient in case the lamp is burned. That is, it is possible to replace the krypton lamp 81 by pulling off and removing the globe 11. After replacing, the globe 11 is inserted again to the opening for connecting the globe 16 of the substrate 12, so that an internal face of the open end 15 of the globe 11 is pressure-fitted to the O-ring 84 and thereby an inside of the globe 11 can be water-sealed.

Additionally, the electric lamp device of this embodiment provides the first through fourth water sealing means. The first water sealing means for water-sealing the globe 11 and the substrate 12 is formed with a packing and the like lying between the globe 11 and the substrate 12. The second water sealing means for water-sealing the globe 11 and the substrate 12 is formed with the O-ring 84. The third water sealing means for water-sealing the attachment 3 and the substrate 12 is formed with a packing, a silicon sealer and the like lying between the attachment 3 and the substrate 12 or between the attachment 3 and tapping screws 44. The fourth water sealing means for water-sealing the guide tube part 19 of the substrate 12 and the tube part 36 of the attachment 3 is formed with the O-ring 42.

An electric lamp device composed as described above has operational effects, as follows.

It is possible to share the outer shell 1 and easily combine different electric lamp types by the attachment 3, thereby providing a diversified electric lamp device.

Also, since the globe 11 is freely occluded with and dissociated from the substrate 12 and provides the first water sealing means for water-sealing the globe 11 and the substrate 12, it is possible to replace krypton lamps 81 inside, and an outdoor use is also possible.

Further, since the globe 11 is freely occluded with and dissociated from the substrate 12 and provides the second water sealing means for water-sealing the globe 11 and the attachment 3, the third water sealing means for water-sealing the attachment 3 and the substrate 12, the fourth water sealing means for water-sealing the guide tube part 19 of the substrate 12 and the tube part 36 of the attachment 3, and the pressure control means 43 for adjusting pressure, both inside and outside the globe 11, by controlling the fourth water sealing means when pressure inside the space enclosed with the globe 11 and the attachment 3 rises above a prescribed pressure value, it is possible to replace bulbs inside, and an outdoor use as well as an improvement in waterproofing is possible, and what is more, since pressure inside the globe 11 is adjusted by the pressure control means 43, it is possible to prevent dewing inside the globe 11.

Figure 11:
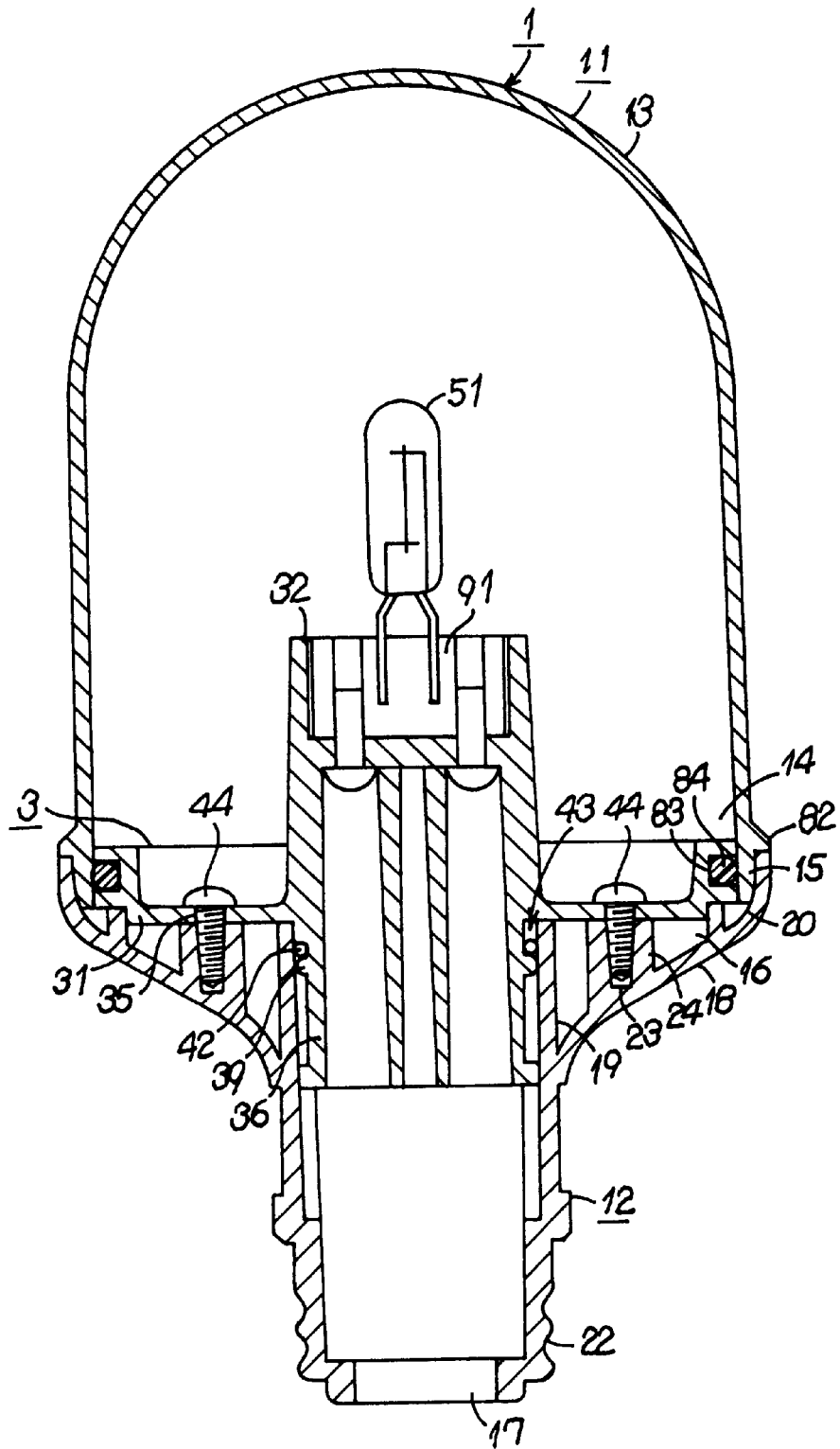
Figure 12:
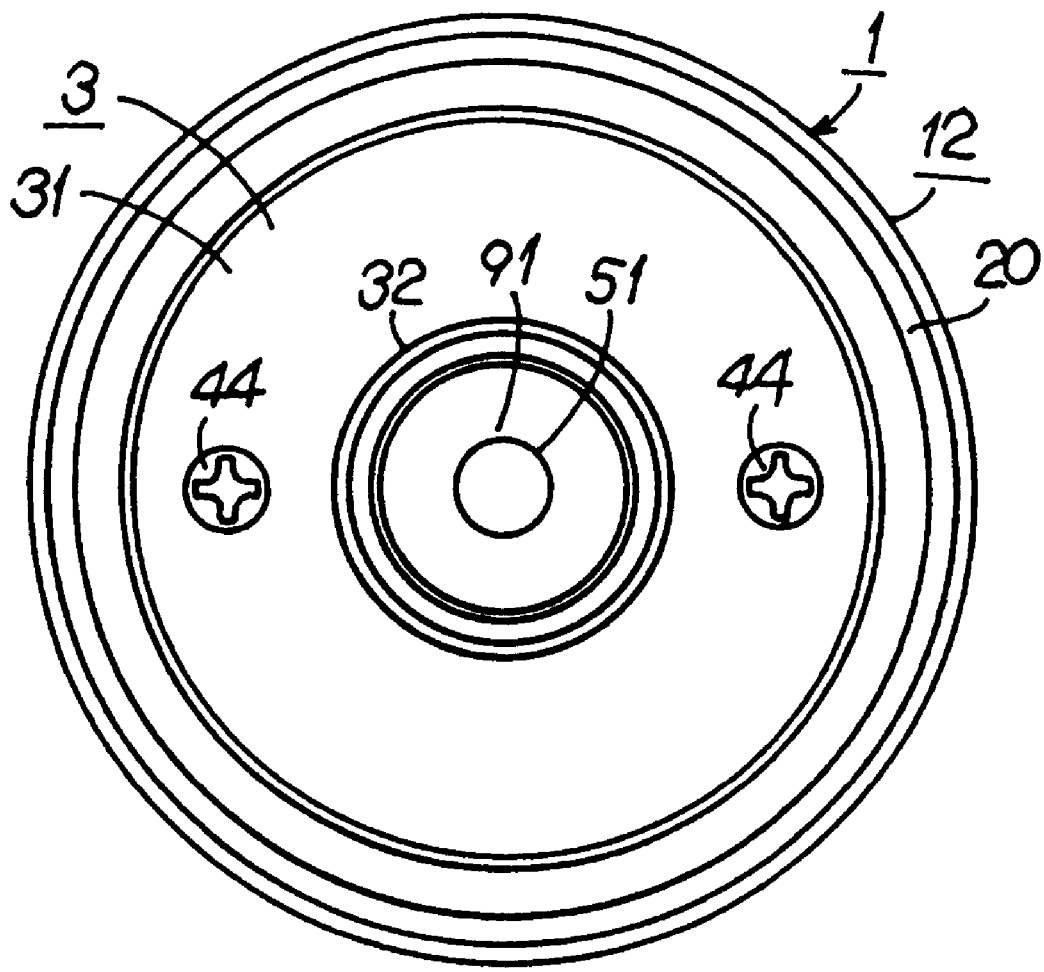

Next, FIG. 11 and FIG. 12 show a fourth embodiment according to the present invention.

Additionally, with regard to structures and operational effects similar to those of the aforementioned embodiments, same symbols are used and their descriptions are omitted.

FIG. 11 is a sectional view of an electric lamp device, and FIG. 12 is a top view showing a condition of the same electric lamp device after removing a globe.

In this fourth embodiment, as no-base type small electric lamps 51, bulbs of a one-side-sealed type and with a low voltage, such as a rated voltage of 12V or 24V, are used.

With regard to the attachment 3, the electric lamp mount 32 is formed higher than the sheet part 31, and a pin-shaped socket 91 is attached to the electric lamp mount 32.

The globe 11 and the substrate 12 are the same as the parts used in the third embodiment.

The base 2 is composed so that it is not mounted to the opening for connecting power supply 17 of the substrate 12 and the threaded groove 22 of the substrate 12 is connected directly to a body of a lighting apparatus.

Figure 13:
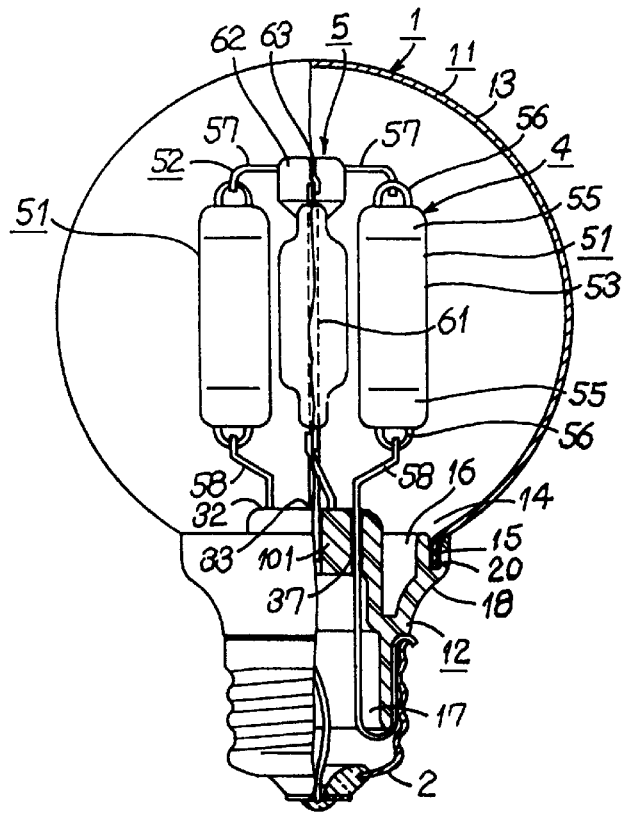
Figure 14:
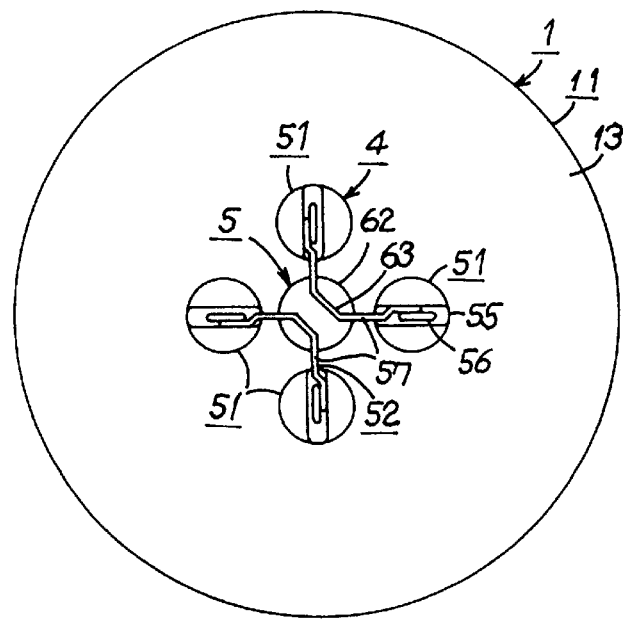
Figure 15:
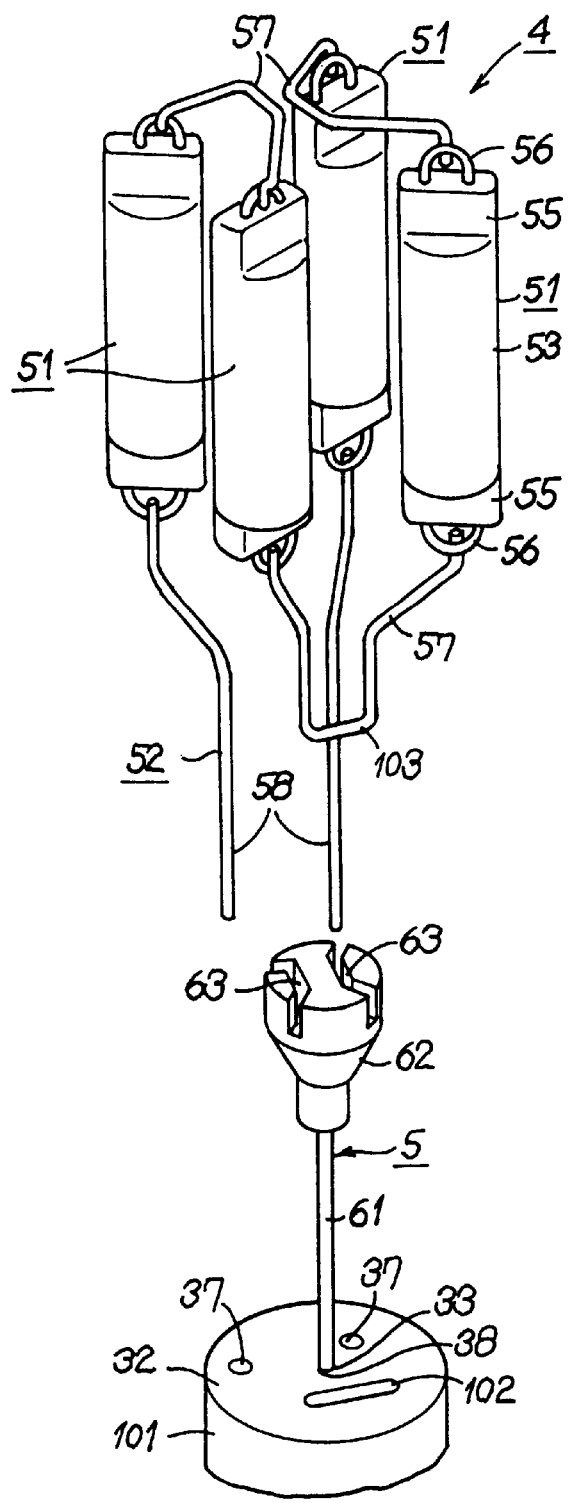

Next, FIG. 13 through FIG. 15 show a fifth embodiment according to the present invention.

Additionally, with regard to structures and operational effects similar to those of the aforementioned embodiments, same symbols are used and their descriptions are omitted.

FIG. 13 is a partially sectional view of an electric lamp device, FIG. 14 is a top view of a serially connected body of no-base type small electric lamps of the same electric lamp device viewed through a globe, and FIG. 15 is a perspective view of the serially connected body of no-base type small electric lamps and the support body of the same electric lamp device.

In this fifth embodiment, the globe 11 of the outer shell 1 is made of a transparent glass. In a middle part of the substrate 12 of the outer shell 1, there is formed a bulkhead part 101 positioned inside the skirt part 18, and the electric lamp mount 32 and the support stand part 33 are formed in the bulkhead part 101. In the electric lamp mount 32, there are formed a pair of conductor holes 37 and a stopper hole 102.

For each conductors 52 of the serially connected body of no-base type small electric lamps 4, an insert part 103 that is inserted to the stopper hole 102 is formed in a middle part of the intermediate conductor 57 on the substrate 12 side.

A pair of conductor support grooves 63 are formed in a top face of the insulating support part 62 of the support body 5. Also, one intermediate conductor 57 positioned above the serially connected body of no-base type small electric lamps 4 is engaged and fixed with a bond to one conductor support groove 63 of the insulating support part 62, and the other intermediate conductor 57 is engaged and fixed with a bond to the other conductor support groove 63. Further, the insert part 103 of an intermediate conductor 57 positioned below the serially connected body of no-base type small electric lamps 4 is inserted to the stopper hole 102 of the substrate 12 and fixed with a bond. As a result, the serially connected body of no-base type small electric lamps 4 is supported at its top and bottom is supported by the support body 5 and the bulkhead 101 in an intermediate joint part, and thereby a mechanically sufficient strength is obtained against externally applied vibrations.

Additionally, this electric lamp device has the globe 11 with a maximum outside diameter of 80 mm and an overall length of 115 mm, and a power consumption of approx. 40 W.

In an electric lamp device composed as described above, since the serially connected body of no-base type small electric lamps 4 that is mounted to the electric lamp device 32 of the substrate 12 and contained within the outer shell 1 is supported by the support body 5 extended from the substrate 12 side, it is possible to improve vibrationproofing of the serially connected body of no-base type small electric lamps 4 and support the serially connected body of no-base type small electric lamps 4 in a prescribed position within the outer shell 1.

Figure 16:
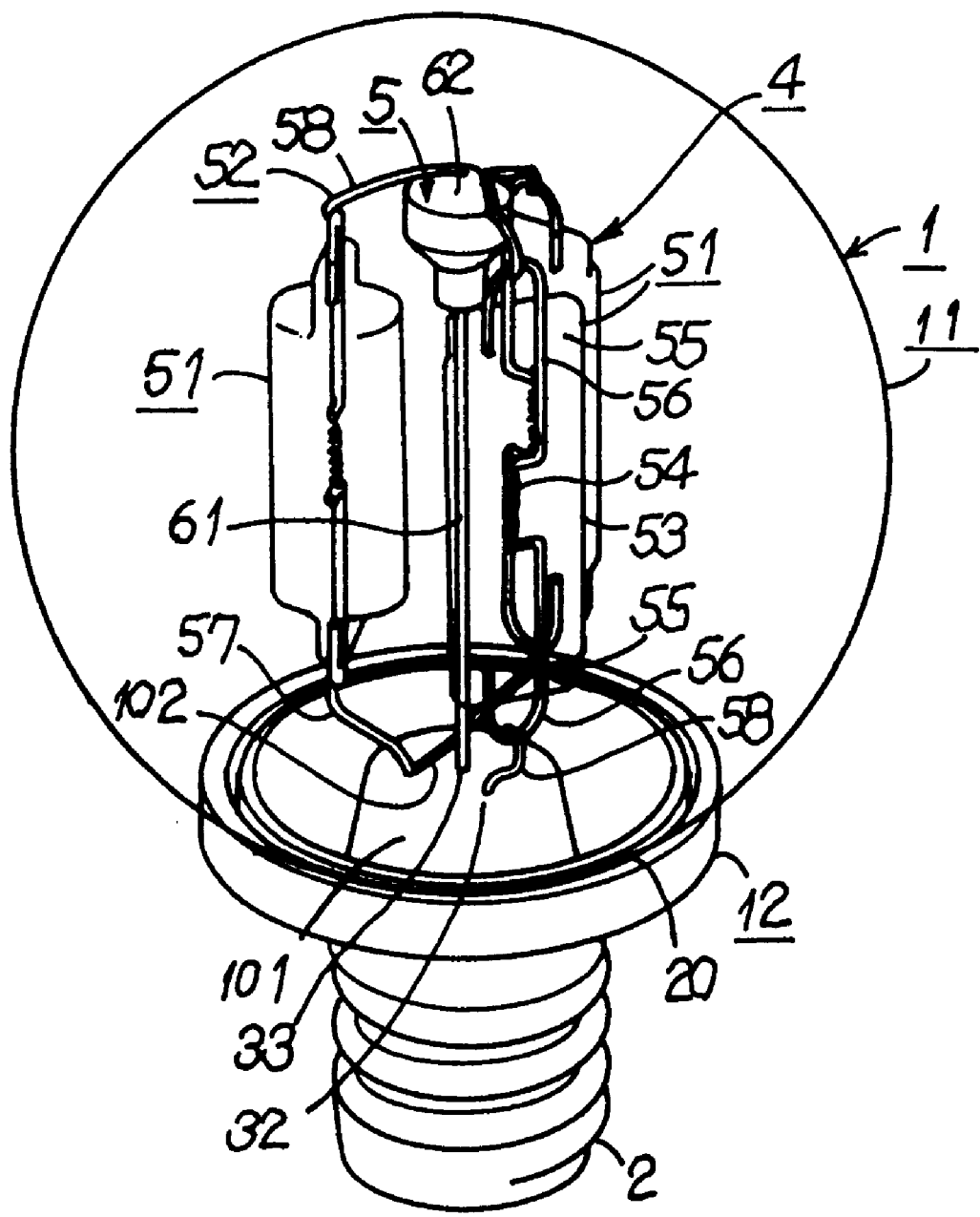
Figure 17:
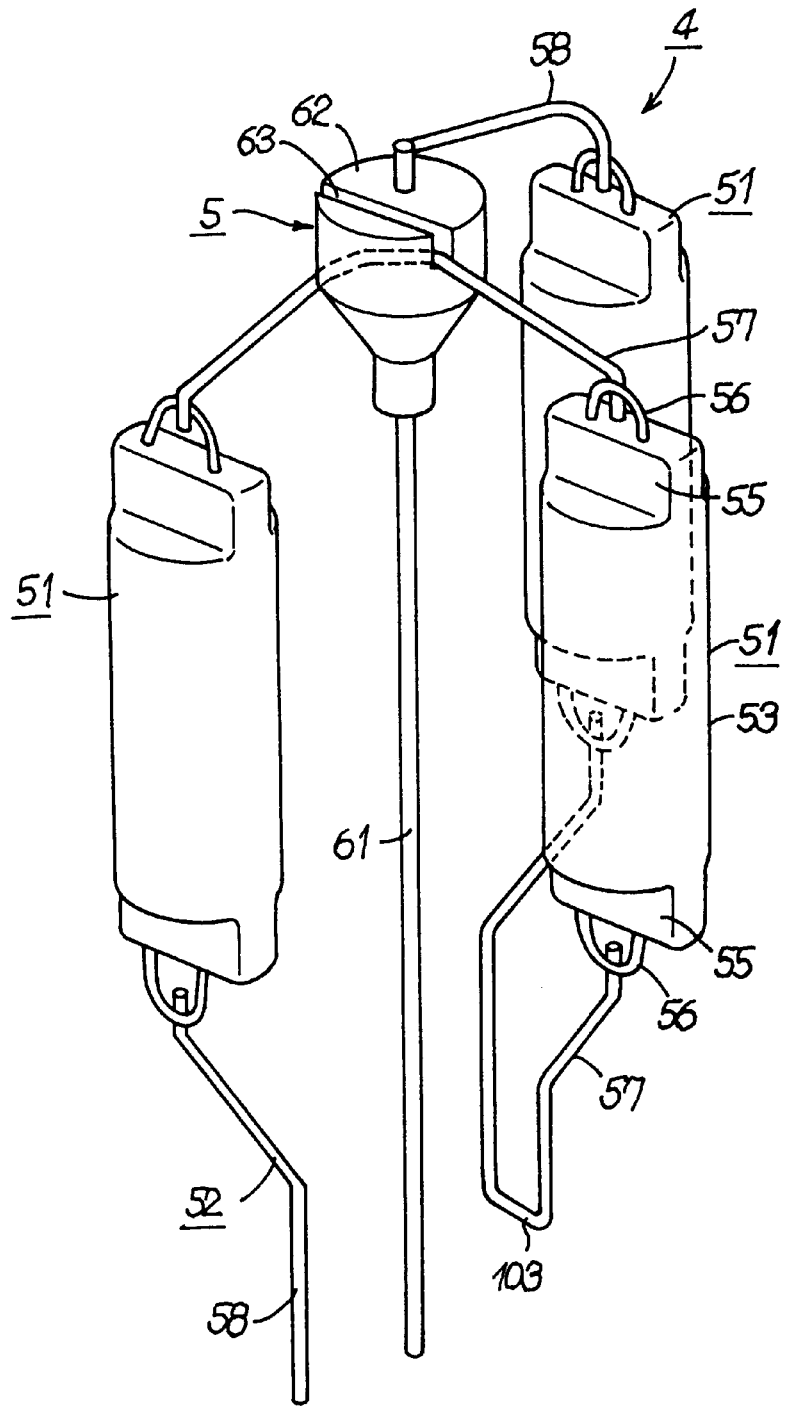

Next, FIG. 16 and FIG. 17 show a sixth embodiment according to the present invention.

Additionally, with regard to structures and operational effects similar to those of the aforementioned embodiments, same symbols are used and their descriptions are omitted.

FIG. 16 is a perspective view of an electric lamp device, and FIG. 17 is a perspective view of a serially connected body of no-base type small electric lamps.

In this sixth embodiment, as the serially connected body of no-base type small electric lamps 4, three no-base type small electric lamps 51 same as those used in the first embodiment are used.

In the serially connected body of no-base type small electric lamps 4, three no-base type small electric lamps 51 are connected serially by two intermediate conductors 57 and two end conductors 58. One end conductor 58 is connected to the metal post 61.

In the insulating support part 62 of the support body 5, there is formed one conductor support groove 63, and the post 61 is protruding above the insulating support part 62.

Also, the base 2 is composed so that it is not mounted to the opening for connecting power supply 17 of the substrate 12 and the threaded groove 22 of the substrate 12 is connected directly to a body of a lighting apparatus. Further, the post 61 can jointly be used as one conductive path of the connector for no-base type small electric lamps 4. Additionally, this electric lamp device has a power consumption of approx. 30 W.

Figure 18:
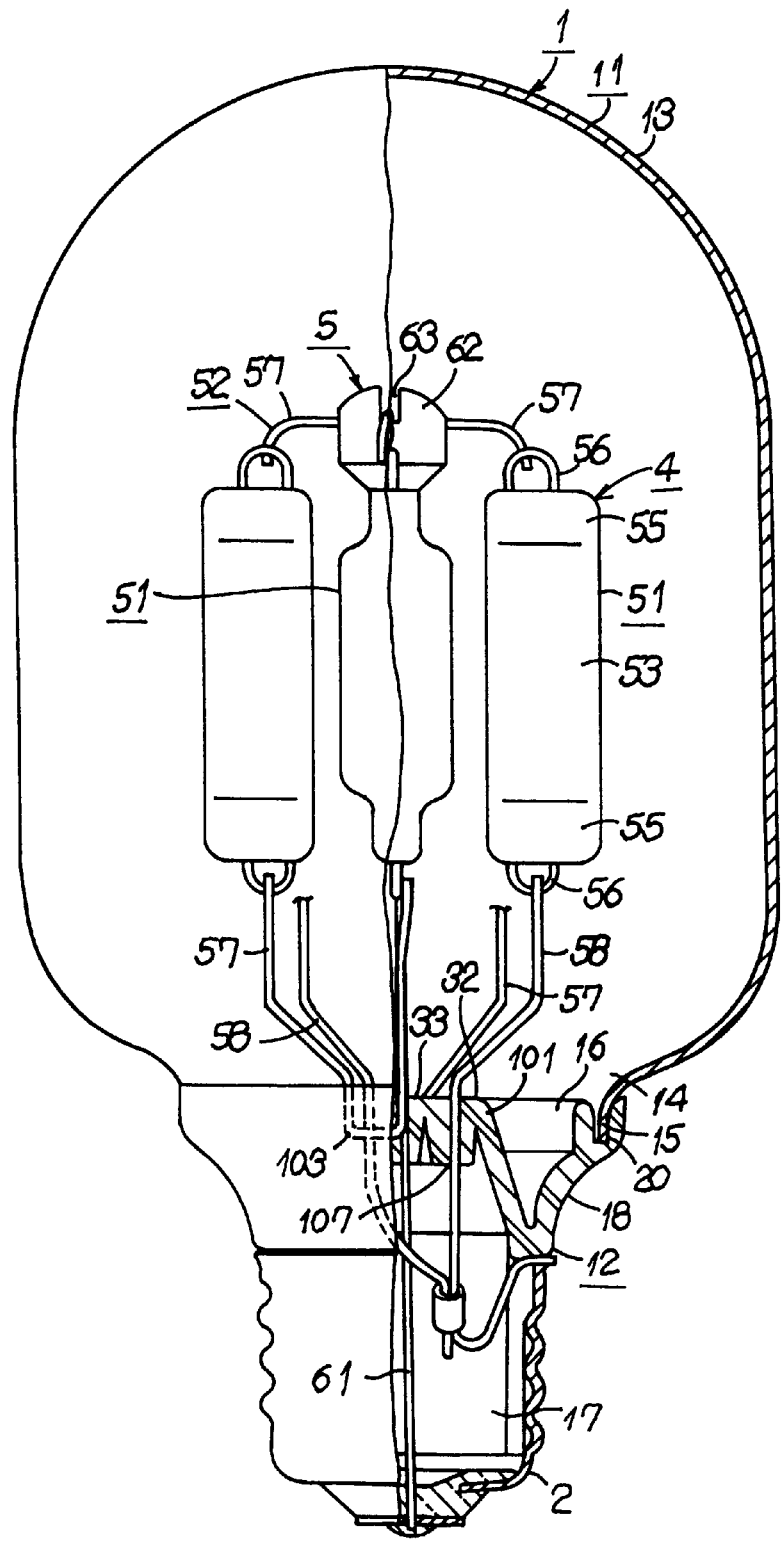
Figure 19:
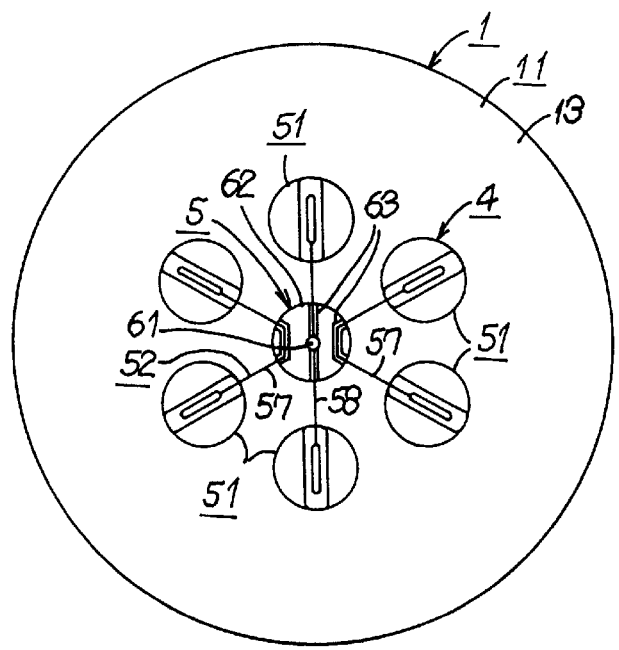
Figure 20:
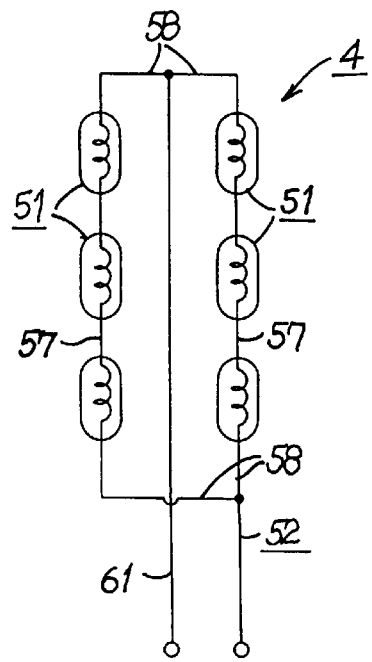

Next, FIG. 18 through FIG. 20 show a seventh embodiment according to the present invention.

Additionally, with regard to structures and operational effects similar to those of the aforementioned embodiments, same symbols are used and their descriptions are omitted.

FIG. 18 is a partially sectional view of an electric lamp device, FIG. 19 is a top view of a serially connected body of no-base type small electric lamps during light transmission, and FIG. 20 is a circuit diagram of the serially connected body of no-base type small electric lamps.

In this seventh embodiment, as the serially connected body of no-base type small electric lamps 4, two sets of parts same as those used in the sixth embodiment are used in a parallel connection, and the support body 5 is composed so as to cope with the serially connected body of no-base type small electric lamps 4.

Additionally, this electric lamp device has a power consumption of approx. 60 W. Next, FIG. 21 shows an eighth embodiment according to the present invention.

Additionally, with regard to structures and operational effects similar to those of the aforementioned embodiments, same symbols are used and their descriptions are omitted.

Figure 21:
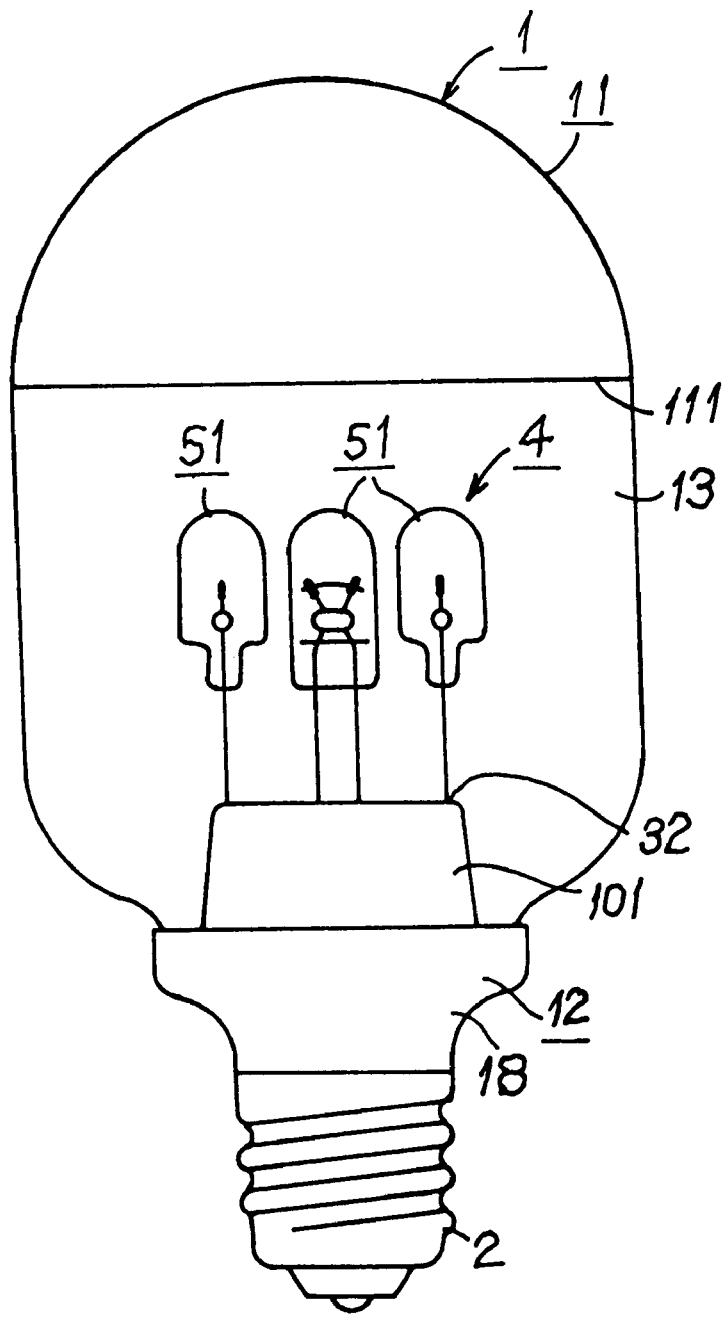

FIG. 21 is a side view of an electric lamp device

In this eighth embodiment, as no-base type small electric lamps 51, bulbs of a one-side-sealed type are used, and a reflection film 111 is formed on the top side of the globe 11. This electric lamp device is applicable to indirect lighting.

Next, FIG. 22 through FIG. 25 show an ninth embodiment according to the present invention.

Additionally, with regard to structures and operational effects similar to those of the aforementioned embodiments, same symbols are used and their descriptions are omitted.

Figure 22:
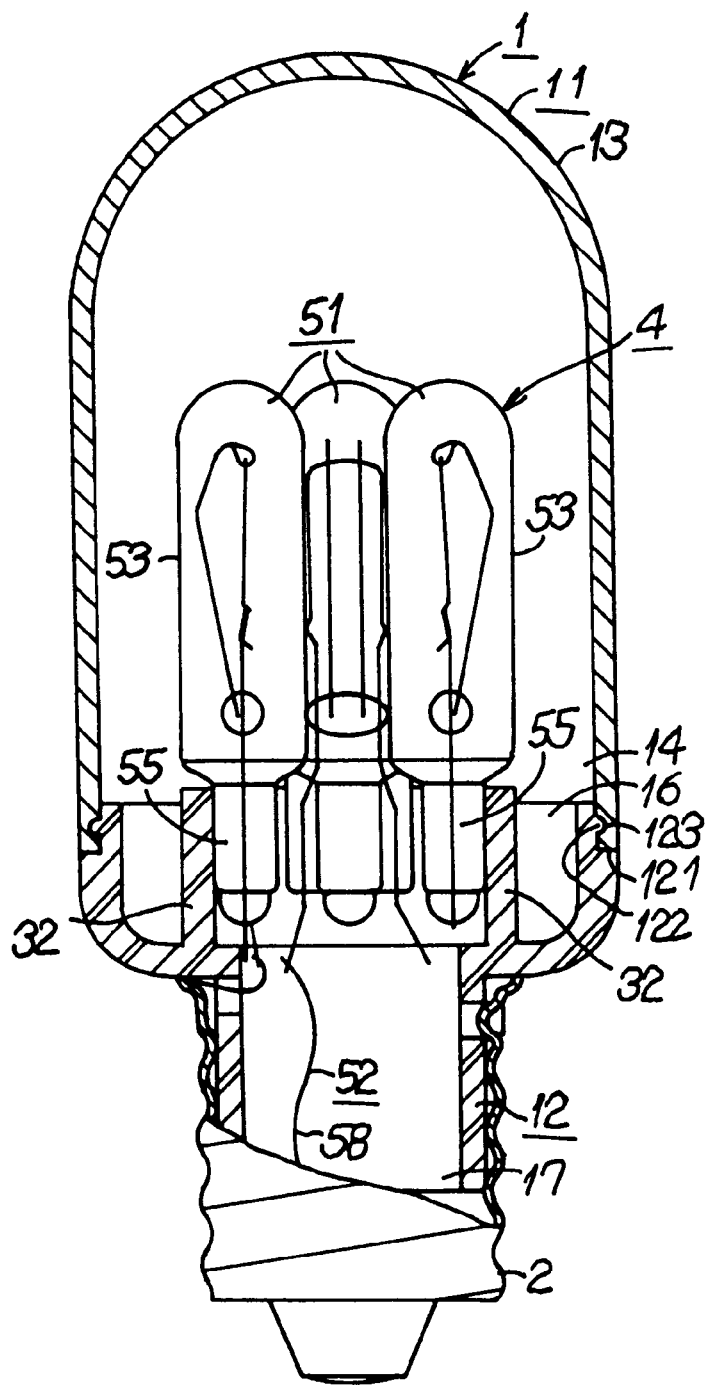
Figure 23:
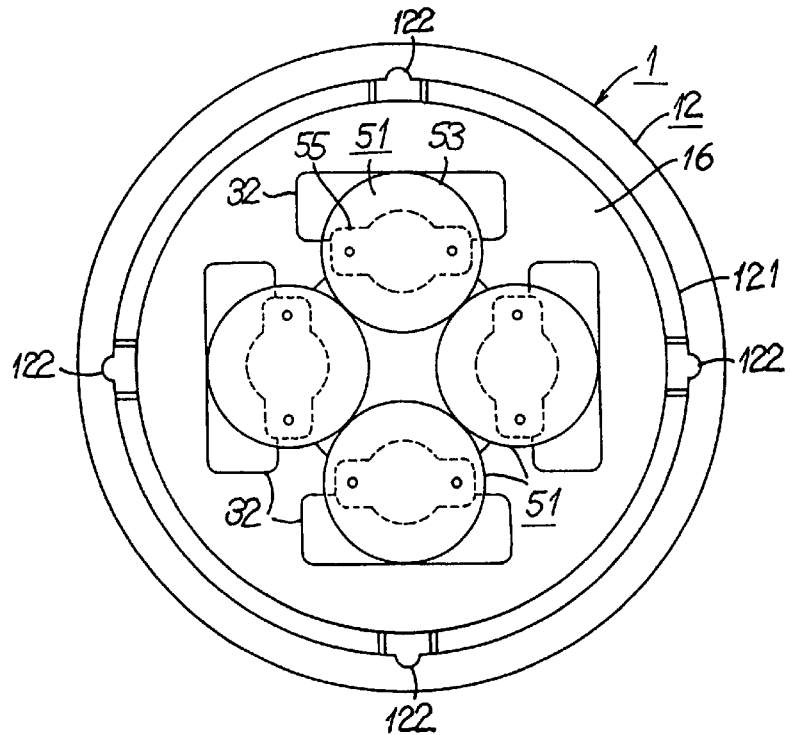
Figure 24:
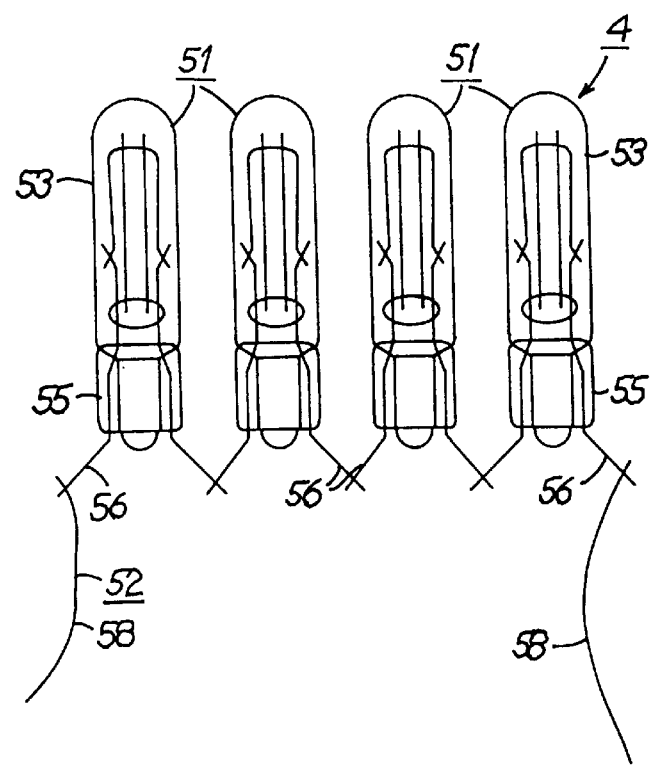
Figure 25:
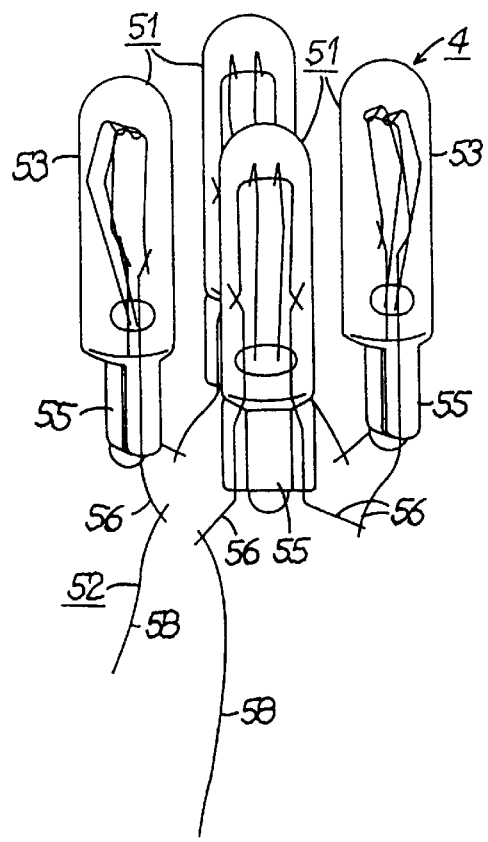

FIG. 22 is a sectional view of an electric lamp device, FIG. 23 is a top view showing a condition after removing a globe, FIG. 24 is a side view showing a developed condition of a serially connected body of no-base type small electric lamps, and FIG. 25 is a perspective view showing an arrangement of the serially connected body of no-base type small electric lamps.

In this ninth embodiment, as the serially connected body of no-base type small electric lamps 4, four pieces of one-side-sealed type no-base type small electric lamps 51, with a bulb diameter of 5 mm and a nominal rated voltage of 28V, for example, are used. These four no-base type small electric lamps 51 are serially connected, and the connection is effected by directly spot-welding external lead wires 56 of neighboring no-base type small electric lamps 51. To the lead wires 56 of the no-base type small electric lamps 51 located at both ends of the serially connected body of no-base type small electric lamps 4, end conductors 58 respectively having a length necessary for connecting to the base 2 are connected.

The outer shell 1 has the globe 11 and the substrate 12, and the base 2 is mounted to the substrate 12.

Inside the substrate, there are mounted seal parts 55 of gathered no-base type small electric lamps 51, and the electric mount 32 for mechanical support is formed. Around the opening for connecting the globe 16 of the substrate 12, there are formed four stopper claws 122 at 90° intervals around a step part 121 (see FIG. 23).

The electric lamp mount part 32, coping with four pieces of no-base type small electric lamps 51, is formed in a sheet shape protruding upward from a bottom part the substrate 12 so that the seal part 55 of each no-base type small electric lamp 51 is stopped and held. To hold these no-base type small electric lamps 51, either the seal part 55 is pressure-inserted to the electric lamp mount 32 or fixed with a bond, or both.

Each of the no-base type small electric lamps 51 held by the electric lamp mount 51, as shown in FIG. 22, is arranged with axes of slender bulbs 53 arranged almost in parallel with each other within the outer shell 1, and further, as shown in FIG. 23, arranged within the outer shell 1 so that axes of bulbs 53 are positioned coaxially around an axis of the outer shell 1.

The globe 11 is formed in a slender T-shape, and its inner bottom periphery is engaged and unified with an outer periphery of the step part 121 of the substrate 12. At the inner bottom periphery of the globe 11, there is formed a concave groove 123 for engaging with the stopper claws 122 that protrude from the step part 121 of the substrate 12. Further, since the concave groove 123 of the globe 11 is engaged with the stopper claws 122 of the substrate 12 by pushing a bottom end opening of the globe 11 into the substrate 12 along the step part 121 of the substrate 12, the globe 11 and the substrate 12 are unified, and thereby the outer shell 1 is formed. Additionally, as needed, a bond may be applied to joint parts of the globe 11 and the substrate 12 to enable air-tight or liquid-tight sealing.

The base 2 is an E12 type base is used.

Also, in FIG. 24 and FIG. 25, a process to attain a serially connected body of no-base type small electric lamps of no-base type small electric lamps 51 is shown wherein, external lead wires 56 of neighboring no-base type small electric lamps 51 are spot-welded and end conductors 58 are directly spot-welded to external lead wires 56 of no-base type small electric lamps 51 at both ends. Further, after shaping no-base type small electric lamps 51 for containing them into the outer shell 1, each of the no-base type small electric lamps 51 is held at each electric lamp mount 32 of the substrate 12. In an electric lamp device composed as described above, since the seal part 55 of each of no-base type small electric lamps 51 is supported by the electric lamp mount 32, it is possible to improve vibrationproof of the serially connected body of no-base type small electric lamps 4 and support the serially connected body of no-base type small electric lamps 4 in a prescribed position within the outer shell 1.

Figure 26:
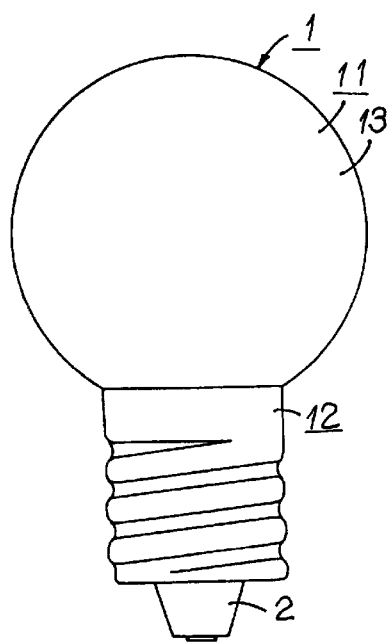
Figure 27:
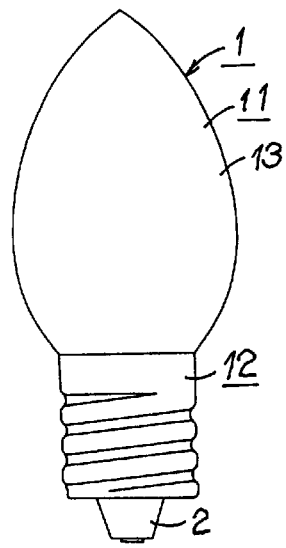
Figure 28:
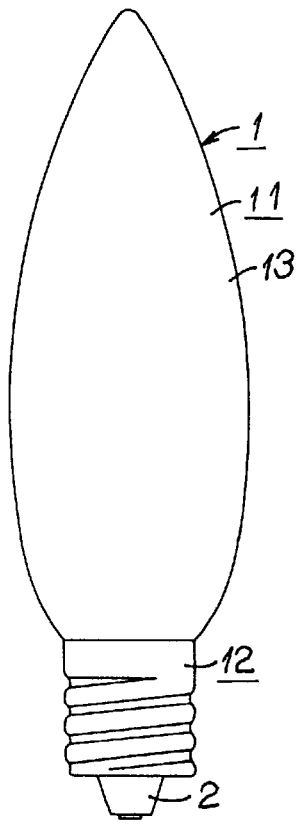

Next, FIG. 26 through FIG. 28 show a tenth, eleventh and twelfth embodiments according to the present invention.

Additionally, for composition other than the outer shell 1 shown in the ninth embodiment, which is the same as that of the ninth embodiment, same symbols are used and their descriptions are omitted.

In the tenth embodiment shown in FIG. 26, the globe 11 of the outer shell 1 is formed in a small ball bulb shape.

In the eleventh embodiment shown in FIG. 27, the globe 11 of the outer shell 1 is formed in a transparent bulb shape.

In the twelfth embodiment shown in FIG. 28, the globe 11 of the outer shell 1 is formed in a chandelier bulb shape.

Definitions of terminologies used for the present invention and their technical meanings are described in the following.

First, an outer shell is described.

The outer shell contains no-base type small electric lamps inside and mechanically protects the no-base type small electric lamps.

The outer shell is formed with components including a globe and a substrate and, as needed, it can be used for optically processing light emission from no-base type small electric lamps. For example, when the outer shell is formed with a transparent colored synthetic resin, it is possible to obtain colored electric lamps with a large quantity of light, compared to conventional electric lamps. Also, it is possible to provide light-diffusing electric lamps either by using a light-diffusing material, or forming a light-diffusing film in an outside face or an inside face of the outer shell, or roughing a surface of the outer shell. It is also possible to give a light-diffusing characteristic by forming prism parts in an inside face or an outside face of an outer shell made of a transparent material.

A material used for the outer shell, particularly the globe, may be freely selected from a polycarbonate resin, other synthetic resins and the like that provide electric insulation and a certain extent of mechanical strength and have at least light-transmitting parts.

The substrate preferably be made of a synthetic resin and, for example, BMC (bulk molding compound), namely a mixture of a polyester resin and an inorganic filler, a polyethylene terephthalate resin or a polyamide resin.

A preferable composition of the outer shell is a globe made of a glass having an excellent light transmission, and a substrate made of a synthetic resin having an excellent workability. However, when the globe is formed with a synthetic resin, an acrylic resin, a polycarbonate resin and the like having an excellent light transmission may be used.

That the globe has a light-transmitting characteristic means that, in addition to being an entirely light-transmitting globe body, the globe may be partially light-transmitting. For example, when a reflecting film is formed at a semi-spherical part of a top part of the globe, it can be used for indirect lighting.

The substrate may have a light-transmitting characteristic, but it can also be made non-light-transmitting, as needed.

Connection of the globe and the substrate can be done by using various know means, including a bond, welding, mechanical connection and the like. However, when charged parts, such as conductors of a serially connected body of no-base type small electric lamps, are exposed when the globe is removed, preferably the globe is fixed to the substrate, disabling free occlusion and dissociation.

An opening for connecting power supply of the substrate can be mounted with a base having the same specification as that for ordinary electric lamps for lighting. Also, by connecting both ends of the serially connected body of no-base type small electric lamps, a normal use as ordinary electric lamps for lighting is made available by mounting an electric lamp device according to the present invention.

It is also possible to compose a lighting apparatus by connecting a body of the lighting apparatus directly to the opening for connecting power supply without mounting the base to the opening for connecting power supply. In this instance, it is possible to connect both ends of the serially connected body of no-base type small electric lamps directly to a power supply.

For a shape of the outer shell, to provide electric lamps that are interchangeable with ordinary electric lamps for lighting, a PS-type or G-type bulb shape like that of ordinary electric lamps for lighting is preferable, but a T type (a date bulb shape) instead of the PS type may also be used. However, since the present invention is not merely intended to replacement with ordinary electric lamps for lighting, the outer shell may take whatever shape. For example, a C type (a votive light shape), the G type (small ball bulb shape), a chandelier bulb shape, types such as A, FE, GR, PAR, PS, R, RP, PK and S, and further, an optionally deformed shape such as a polyhedron shape, a concrete shape such as a fruit shape, and an abstract shape may also be available.

Next, an attachment is described.

The attachment at its sheet part is occluded inside a wide opening for connecting a globe of a substrate. Preferably, the attachment forms an enclosed space in cooperation with the globe.

The attachment is fixed to the substrate with a fixture, a bond and the like.

An electric lamp mount of the attachment supports no-base type small electric lamps, and at the same time, extends a pair of conductors, provided at both ends of a serially connected body of no-base type small electric lamps, to an opening for connecting power supply.

A support stand part of the attachment is a part where a support body, either separated from or unified with the attachment, stands. That is, the support body is extended from the attachment.

Next, a serially connected body of no-base type small electric lamps is described.

Of no-base type small electric lamps, the expression "no-base type" basically means an electric lamp that does not use a base made of a metal or a synthetic resin, for example, a pinch seal construction in which a bulb end is sealed pitch-molding, a bead seal construction in which sealing is done using glass beads, and a construction in which a glass bulb end is heated and melted by a burner. Also, for processing of external lead wires, it is provided by a wedge base construction in which external lead wires are laid along the pinch-sealed part, a construction in which external lead wires protrude from the sealed part either linearly or in a loop shape along a bulb axis direction.

Of no-base type small electric lamps, the expression "small" means an electric lamp of which a bulb is small in size and small in volume, such as a wedge base type electric lamp and a sub-miniature type electric lamp, and that is lit with a low nominal rated voltage which is about a third or less of a commercial power source voltage. For a bulb shape, various shapes are allowed, but preferably a slender shape like a T-shape bulb. Extension of external lead wires preferably be a both-end-fixed construction in which they are extended from both ends, but a one-side-sealed type is also acceptable.

Of no-base type small electric lamps, the expression "electric lamps" means an incandescent lamp having a filament sealed inside a bulb. An inactive gas is sealed inside the bulb. Since sealing particularly a krypton gas or a xenon gas that is large in atomic weight, small in heat conductivity can reduce a heat loss inside the bulb, it brings a favorable result in making the electric lamp smaller, longer life and more efficient. Also, the above-mentioned tendency becomes more noticeable as a pressure of a sealed gas is increased. Of course, it goes without saying that a bulb construction that can withstand a high gas pressure under a high temperature condition during lighting.

Since no-base type small electric lamps are lit with a low voltage and have thick filaments compared with ordinary electric lamps for lighting, and yet they are short in length, they have long service life and are resistive against vibrations.

To gather is to arrange a plurality of no-base type small electric lamps at small intervals so as to form a compact profile, and in particular viewed from an optional no-base type small electric lamp, preferably two or more no-base type small electric lamps are arranged at small intervals. A small interval is a distance of about 1.5 times or preferably 1 time or less of a length of a bulb of such no-base type small electric lamps, and no-base type small electric lamp may touch each other.

However, since being separated with a proper distance distributes heat generating parts, it is possible to control temperature increase.

Also, a preferable means to compactly gather no-base type small electric lamps is to arrange bulb axes in parallel and coaxially, and further, arrange the no-base type small electric lamps at equal intervals. Further, to contain these no-base type small electric lamps in an outer shell, it is possible to provide electric lamps that have a favorable appearance and are compact by making axes of the outer shell and no-base type small electric lamps the same. However, it is possible to divert some no-base type small electric lamps from the remaining no-base type small electric lamps in an axial direction, and in this case, though a length along the axial direction of the outer shell is increased a little, it is possible to reduce interference of light between no-base type small electric lamps and increase an effective quantity of light.

To serially connect no-base type small electric lamps, external lead wires of these electric lamps may be connected directly or by means of suitable connection members, such as other conductors.

By setting a total of a nominal rated voltage of no-base type small electric lamps a little higher than a nominal power source voltage, luminous efficacy decreases a little but the difference is negligible, and on the other hand, it is possible to make the electric lamps far longer life. When the total of the nominal rated voltage of no-base type small electric lamps a little higher than the nominal power source voltage, generally a range of 100 to 120% or less or preferably 110%0+/−5% is possible.

Next, a support body is described.

The support body is intended to support a serially connected body of no-base type small electric lamps in a prescribed position, and it is extended from an attachment. Since no-base type small electric lamps individually provide bulbs, unlike conventional ordinary electric lamps for lighting in which filaments alone are supported, a weight is not negligible and so the support must be one that is properly strong mechanically.

A method to support a serially connected body of no-base type small electric lamps can be freely selected from various construction types, for example, bulbs may also be supported or it is also possible to support conductors that connect electric lamps or conductors that form end parts of the serially connected body of no-base type small electric lamps. By adding a mechanical strength to conductors that connect electric lamps, it is possible to let them function as supports.

When conductors that form intermediate joints of electric lamps are to be supported, it is preferable to make at least parts that directly support the intermediate joint parts insulating bodies. Then, it is also possible to support more than one intermediate joint parts at a time. Insulating support parts can be formed with a synthetic resin, such as a polyamide, or glass.

By using metal rods for parts standing from an attachment to make them thoroughly rigid, a favorable result can be obtained. However, if needed, they can be made monolithic with the attachment.

Next, a base is described.

The base in terms of shape can be either of a screw type called an E type, and insert type called a BA type, a P type or a B type, but from the viewpoint of interchangeability, the E type which is popularly used is preferable. Also, there are several types of base size by diameter sizes. For the present invention, essentially any type is acceptable, but to get electric lamps with a rated power consumption of 20 to 100 W that are replaceable with ordinary electric lamps for lighting, types such as E26 and E17 are suitable. Further, to get an electric lamp device that is relatively compact and with a power consumption of 5 to 10 W, an E12 type is suitable.

To arrange a base in an outer shell, since a substrate is attained by molding when it is made of a synthetic resin, it is possible to adopt a construction suitable for the base. For example, by molding a small diameter part at one end of the substrate, it is possible to occlude the base with the small diameter part, and either by bonding or by providing a small hole for stopping at the small diameter part, fix the base by pressure-fitting it into the small hole by deforming the same by a punch from an outside of the base. Also, by forming a slit in the small hole part, it is possible to arrange one conductor of the serially connected body of no-base type small electric lamps to the base by way of this slit.

Next, a pressure control means is described.

To control a fourth water sealing means by the pressure control means is to release the fourth water sealing means automatically and a water sealing action temporarily when pressure of an inside space rises above a prescribed pressure value. After an air of the inside is discharged by the fourth sealing means, the water sealing action is resumed.

When the fourth water sealing means is formed with a packing so as to perform the operation described above, the packing at its part is composed so that, when pressure of the inside space rises, the packing moves to release the water sealing action by this movement. When the internal pressure is balanced, the packing returns to its original position by means of its elasticity and performs the water sealing action again. When an external pressure is high, an inside of the globe is maintained at a low pressure because there is the fourth water sealing means.

INDUSTRIAL APPLICABILITY

As described above, an electric lamp device according to the present invention is suitable for use in a place that allows replacement with incandescent lamps, for example.

What is claimed is:

1. An electric lamp device comprising:
   a globe having an opening and a light transmitting part;
   an outer shell having an opening for connecting the globe in which an opening of the globe is connected to one end, and providing at the other end a substrate having a relatively slender opening for connecting power supply, compared with the opening for connecting the globe;
   an electric lamp mount part arranged in a substrate within the outer shell;
   a serially connected body of no-base type small electric lamps having a plurality of no-base type small electric lamps and conductors for serially connecting these no-base type small electric lamps, these no-base type small electric lamps being gathered, mounted to said electric lamp mount part and contained within said outer shell; and
   a support body, extended from the substrate, for supporting said serially connected body of no-base type small electric lamps within said outer shell.

2. An electric lamp device as claimed in claim 1, wherein: the support body forms a conductive path of the serially connected body of no-base type small electric lamps at its one end.

3. An electric lamp device as claimed in claim 1, wherein: the globe is formed by molding a colored transparent synthetic resin.

4. An electric lamp device as claimed in claim 1, wherein: the base that is mounted to the opening for connecting power supply of the substrate is provided.

5. An electric lamp device as claimed in claim 1, wherein: the support body has an insulating support part in which a conductor support groove to which conductors of a serially connected body of no-base type small electric lamps are formed and a post by which the insulating support part is supported.

6. An electric lamp device as claimed in claim 1, wherein: the support body has an insulating support part, in which a plurality of conductor support grooves to which a plurality of conductors for serially connecting a plurality of no-base type small electric lamps of the serially connected body of no-base type small electric lamps are formed, and a post by which the insulating support part is supported.

7. An electric lamp device as claimed in claim 1, wherein: the serially connected body of no-base type small electric lamps has an intermediate connecting body and the support body supports the intermediate connecting body of said serially connected body of no-base type small electric lamps.

8. An electric lamp device comprising:
   a globe having an opening and a light transmitting part;
   an outer shell having an opening for connecting the globe in which an opening of the globe is connected to one end, and providing at the other end a substrate having a relatively slender opening for connecting power supply, compared with the opening for connecting the globe;
   an attachment having a sheet part, an electric lamp mount part and an extended part of a support body that are engaged within the opening of said substrate for connecting the globe;
   a serially connected body of no-base type small electric lamps having a plurality of no-base type small electric lamps and conductors for serially connecting these no-base type small electric lamps, these no-base type small electric lamps being gathered and mounted to the electric lamp mount part of said attachment, and conductors of both ends being led to the opening for connecting power supply of said substrate, passing through the attachment; and
   a support body, extended from the support stand part of said attachment, for supporting said serially connected body of no-base type small electric lamps within said outer shell.

9. An electric lamp device as claimed in claim 8, wherein: the attachment has a plurality of projections for supporting conductors of the serially connected body of no-base type small electric lamps and separating no-base type small electric lamps from the attachment.

10. An electric lamp device as claimed in claim 8, wherein: no-base type small electric lamps of the the serially connected body of no-base type small electric lamps are each made as a both-end-sealed type structure and arranged almost in parallel with an axial direction of the outer shell, and, the conductor has a first conductor part that is arranged at ends of no-base type small electric lamps apart from the substrate and a second conductor part that is arranged at ends of no-base type small electric lamps close to the substrate, the support body supports the first conductor part of said serially connected body of no-base type small electric lamps, and the attachment has a plurality of projections for supporting the second conductor part of said serially connected body of no-base type small electric lamps and separating no-base type small electric lamps from the attachment.

11. An electric lamp device as claimed in claim 8, wherein: the support body has an insulating support part in which a conductor support groove to which conductors of a serially connected body of no-base type small electric lamps are formed and a post by which the insulating support part is supported.

12. An electric lamp device as claimed in claim 8, wherein: the support body has an insulating support part, in which a plurality of conductor support grooves to which a plurality of conductors for serially connecting a plurality of no-base type small electric lamps of the serially connected body of no-base type small electric lamps are formed, and a post by which the insulating support part is supported.

13. An electric lamp device as claimed in claim 8, wherein: the serially connected body of no-base type small electric lamps has an intermediate connecting body and the support body supports the intermediate connecting body of said serially connected body of no-base type small electric lamps.

14. An electric lamp device as claimed in claim 8, wherein: the support body forms a conductive path of the serially connected body of no-base type small electric lamps at its one end.

15. An electric lamp device comprising:
   a globe having an opening and a light transmitting part;
   an outer shell having an opening for connecting the globe in which an opening of the globe is connected to one end, and providing at the other end a substrate having a relatively slender opening for connecting power supply, compared with the opening for connecting the globe;
   an electric lamp mount part arranged in a substrate within the outer shell;
   a serially connected body of no-base type small electric lamps having a plurality of no-base type small electric lamps having sealed parts, these no-base type small electric lamps being gathered and serially connected, and the sealed parts of no-base type small electric lamps being supported by said electric lamp mount part and contained within said outer shell.

16. An electric lamp as claimed in claim 15, wherein: no-base type small electric lamps are sealed with a xenon gas in the sealed parts.

17. An electric lamp device comprising:
   a globe having an opening and a light transmitting part;
   an outer shell having an opening for connecting the globe in which an opening of the globe is connected to one end, providing at the other end a substrate having a relatively slender opening for connecting power supply, compared with the opening for connecting the globe, and having a guide tube part opened toward the opening for connecting the globe and connected to the opening for connecting power supply;
   an attachment having a sheet part engaged within the opening for connecting the globe of said substrate, an electric lamp mount part and a tube part engaged within the guide tube part of the substrate and connected to the electric lamp mount part;
   electric lamps mounted to the electric lamp mount part of the attachment; and
   pressure control means for adjusting pressure, both inside and outside the globe.

18. An electric lamp device as claimed in claim 17, wherein: the globe is freely occluded with and dissociated from the substrate and provides a first water sealing means for water-sealing said globe and substrate.

19. An electric lamp device as claimed in claim 17, wherein: the globe is freely occluded with and dissociated from the substrate and provides a second water sealing means for water-sealing said globe and attachment, a third water sealing means for water-sealing said attachment and substrate, and a fourth water sealing means for water-sealing the guide tube part of said substrate and the tube part of the attachment.

20. An electric lamp device as claimed in claim 7, wherein: the globe is freely occluded with an dissociated from the substrate and provides a second water sealing means for water-sealing said globe and attachment, a third water sealing means for water-sealing said attachment and substrate, a fourth water sealing means for water-sealing the guide tube part of said substrate and the tube part of the attachment, and the pressure control means for adjusting pressure, both inside and outside the globe, by controlling said fourth water sealing means when pressure inside a space enclosed with said globe and attachment rises above a prescribed pressure value.

21. An electric lamp device as claimed in claim 17, wherein: the globe is formed by molding a colored transparent synthetic resin.

22. An electric lamp device as claimed in claim 17, wherein: the base that is mounted to the opening for connecting power supply of the substrate is provided.

* * * * *